(12) United States Patent
Fukumori et al.

(10) Patent No.: US 10,248,518 B2
(45) Date of Patent: Apr. 2, 2019

(54) INFORMATION PROCESSING DEVICE AND METHOD OF STORING FAILURE INFORMATION

(71) Applicant: FUJITSU LIMITED, Kawasaki-shi, Kanagawa (JP)

(72) Inventors: Masato Fukumori, Chohu (JP); Haruhiko Ueno, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 186 days.

(21) Appl. No.: 15/398,089

(22) Filed: Jan. 4, 2017

(65) Prior Publication Data

US 2017/0235655 A1    Aug. 17, 2017

(30) Foreign Application Priority Data

Feb. 12, 2016   (JP) .................................. 2016-025302

(51) Int. Cl.
*G06F 11/00* (2006.01)
*G06F 11/22* (2006.01)

(52) U.S. Cl.
CPC ...... *G06F 11/2268* (2013.01); *G06F 11/2284* (2013.01)

(58) Field of Classification Search
CPC .......................... G06F 11/2268; G06F 11/2284
See application file for complete search history.

(56) References Cited

U.S. PATENT DOCUMENTS

| | | | | |
|---|---|---|---|---|
| 5,278,828 A * | 1/1994 | Chao | ....................... | H04L 49/20 370/394 |
| 5,502,833 A * | 3/1996 | Byrn | ........................ | G06F 5/06 710/240 |
| 6,523,060 B1 * | 2/2003 | Kao | ........................ | G06F 5/06 370/413 |
| 7,346,812 B1 * | 3/2008 | Wickeraad | .......... | G06F 11/0772 714/45 |
| 9,563,555 B2 * | 2/2017 | Flynn | ..................... | G11C 16/26 |

(Continued)

FOREIGN PATENT DOCUMENTS

| | | |
|---|---|---|
| JP | 2000-278308 | 10/2000 |
| JP | 2008-225599 | 9/2008 |

*Primary Examiner* — Marc Duncan
*Assistant Examiner* — Jonathan D Gibson
(74) *Attorney, Agent, or Firm* — Staas & Halsey LLP

(57) ABSTRACT

An information processing device includes a processor configured to perform a diagnosis of hardware of the information processing device. The processor is configured to generate plural pieces of failure information. The plural pieces of failure information are classified into groups corresponding to different importance levels. The processor is configured to store the plural pieces of failure information in consecutive storage areas. The consecutive storage areas are divided into storage sections corresponding to the respective groups in order of importance level. The processor is configured to store first piece of failure information in a head of a second storage section in absence of free areas in first storage section. The first storage section is secured for a first group including the first piece of failure information. The second storage section is secured for a second group corresponding to a second importance level lower than the first importance level by one level.

10 Claims, 14 Drawing Sheets

(56) References Cited

U.S. PATENT DOCUMENTS

| | | | |
|---|---|---|---|
| 2007/0198445 A1* | 8/2007 | Zen | G06N 7/005 |
| | | | 706/15 |
| 2009/0150599 A1* | 6/2009 | Bennett | G06F 11/1441 |
| | | | 711/103 |
| 2010/0088541 A1* | 4/2010 | Tanaka | G06F 11/0781 |
| | | | 714/6.12 |
| 2012/0054379 A1* | 3/2012 | Leung | G06F 1/3206 |
| | | | 710/23 |
| 2013/0169336 A1* | 7/2013 | Ozaki | G06F 1/06 |
| | | | 327/261 |
| 2015/0242139 A1* | 8/2015 | Moore | G06F 3/0619 |
| | | | 711/114 |

* cited by examiner

INFORMATION PROCESSING DEVICE AND METHOD OF STORING FAILURE INFORMATION

CROSS-REFERENCE TO RELATED APPLICATION

This application is based upon and claims the benefit of priority of the prior Japanese Patent Application No. 2016-025302 filed on Feb. 12, 2016, the entire contents of which are incorporated herein by reference.

FIELD

The embodiment discussed herein is related to an information processing device and a method of storing failure information.

BACKGROUND

A central processing unit (CPU) of an information processing device executes a self-diagnostic program called a power on self test (POST) at the time of power-on or reset execution. The POST detects a failure of hardware installed in the information processing device and notifies a service processor (SVP) of information about the detected failure.

When the POST is executed, a main memory device is not yet initialized. Thus, the service processor stores the failure information generated by the POST in a storage device, such as a static random access memory (SRAM) or a CPU cache, which is available without being initialized.

As a method of storing data in a memory that stores therein an address table, there is known a method of dynamically changing the boundary of areas for address information with high reference frequency and address information with low reference frequency to effectively use the memory.

As a method of storing a log in a storage device, there is known a method of storing new log information by removing a log with a lowest priority when a second storage area, which is to be secured when a first storage area runs out of free space, is not available.

Related techniques are disclosed in, for example, Japanese Laid-open Patent Publication No. 2000-278308 and Japanese Laid-open Patent Publication No. 2008-225599.

The storage device such as an SRAM or a CPU cache, which stores therein failure information, is available without being initialized, but has a small capacity.

SUMMARY

According to an aspect of the present invention, provided is an information processing device including a memory and a processor coupled to the memory. The processor is configured to perform a diagnosis of hardware of the information processing device. The processor is configured to generate plural pieces of failure information that each indicates a failure detected by the diagnosis. The plural pieces of failure information are classified into groups corresponding to respective different importance levels. The processor is configured to store the plural pieces of failure information in consecutive storage areas of the memory. The consecutive storage areas are divided into storage sections corresponding to the respective groups in order of importance level. The processor is configured to store first piece of failure information in a head of a second storage section among the storage sections in absence of free areas in first storage section among the storage sections. The first piece of failure information is included in a first group among the groups. The first group corresponds to a first importance level among the importance levels. The first storage section is secured for the first group. The second storage section is secured for a second group among the groups. The second group corresponds to a second importance level among the importance levels. The second importance level is lower than the first importance level by one level. The first storage section and the head of the second storage section are consecutive.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENT

Hereinafter, descriptions will be made on embodiment with reference to drawings.

Figure 1:
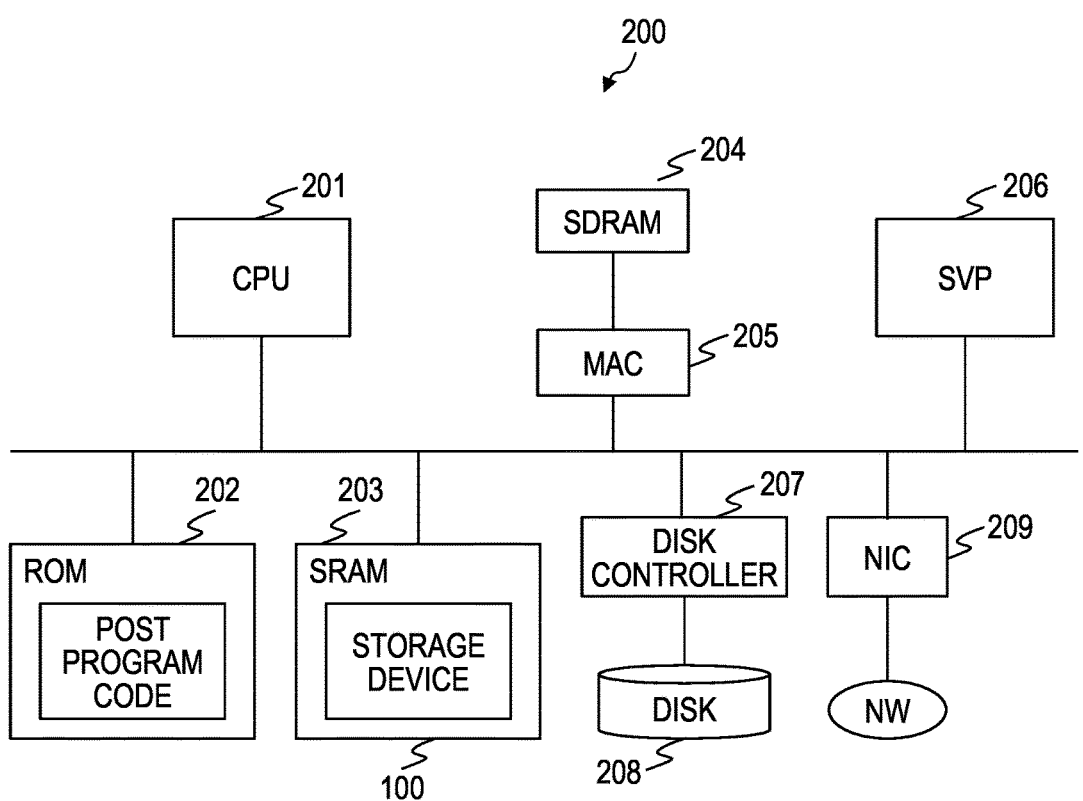
FIG. 1 is a diagram illustrating an exemplary hardware configuration of an information processing device according to an embodiment.

FIG. 1 is a diagram illustrating an exemplary hardware configuration of an information processing device according to an embodiment. The information processing device 200 includes a CPU 201, a read-only memory (ROM) 202, an SRAM 203, a synchronous dynamic random access memory (SDRAM) 204, a memory access controller (MAC) 205, an SVP 206, a disk controller 207, a disk 208, and a network interface card (NIC) 209. The CPU 201, the ROM 202, the SRAM 203, the MAC 205, the SVP 206, the disk controller 207, and the NIC 209 are coupled to each other. The CPU 201 executes a POST that is a program for diagnosing hardware installed in the information processing device. The ROM 202 stores therein a POST program that is executed by the CPU 201. The SRAM 203 stores therein failure information indicating a failure in hardware, which is detected by the POST. The SRAM 203 is a storage device that becomes available without being initialized after the information processing device 200 is powered ON. Hereinafter, a storage area within the SRAM 203, in which the failure information is to be stored, will be referred to as a "storage device 100".

The SDRAM 204 is a main memory device that stores therein data used in the CPU 201. The SDRAM 204 is not available until initialization is completed after the information processing device 200 is powered ON. Thus the SDRAM 204 does not store therein failure information indicating a failure in hardware, which is detected by the POST. The MAC 205 controls an access to the SDRAM 204. The MAC 205 is coupled to the SDRAM 204. The disk 208 is an external storage device. The disk controller 207 controls an access to the disk 208.

When confirming that the CPU 201 is activated after the information processing device 200 is powered ON, the SVP 206 instructs the CPU 201 to execute the POST program. The SVP 206 acquires the failure information outputted as a diagnosis result by the POST, and stores the acquired failure information in the storage device 100. The NIC 209 is used to couple the information processing device 200 to an external network. The information processing device 200 may be implemented by, for example, a computer or the like. The CPU 201 itself is subjected to the hardware diagnosis by the POST. Hereinafter, the CPU 201 that executes the POST will be referred to as a "processor 210".

Figure 2:
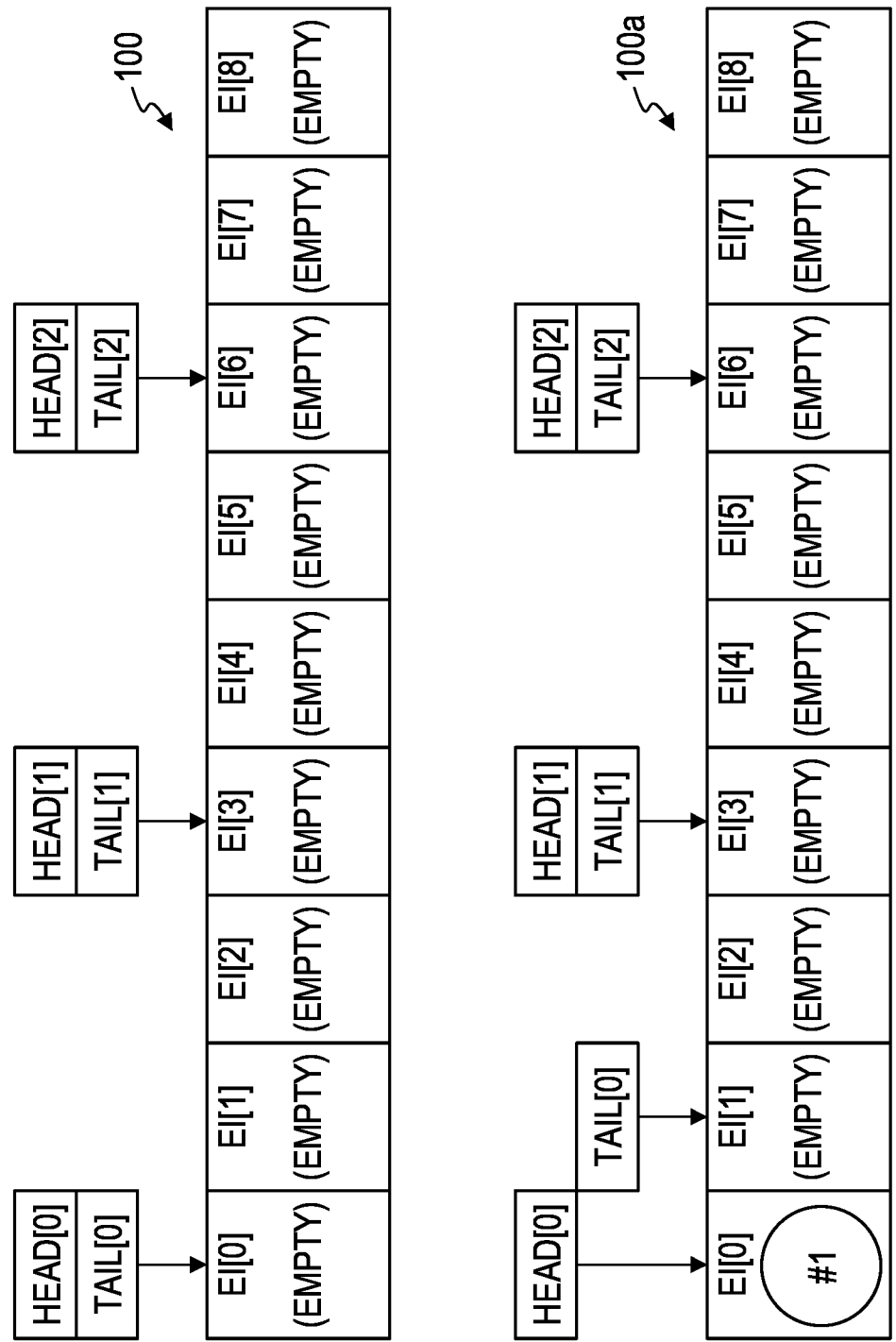
FIG. 2 is a diagram illustrating an example of a storage process of storing new failure information in a storage device.

FIG. 2 is a diagram illustrating an example of a storage process of storing new failure information in a storage device. As a result of the POST executed when the information processing device 200 is powered ON, the SVP 206 stores, in the storage device 100, failure information acquired when a failure occurs in hardware installed in the information processing device 200. The storage device 100 that becomes available when the power is applied is provided in the SRAM 203, the CPU cache, or the like which is available without being initialized. The storage device 100 includes a plurality of storage areas EI (error information) for storing the failure information. The storage areas EI of the storage device 100 are represented by storage areas EI[0] to EI[8] in, for example, a one-dimensional array. The numbers 0 to 8 in EI[0] to EI[8] are element numbers indicating respective storage areas represented as the one-dimensional array. The storage areas EI[0] to EI[8] are storage areas having the same capacities.

The failure information according to the present embodiment is classified into a plurality of importance levels i. When the failure information is classified into more importance levels i, a maintenance person may easily grasp the importance of the failure information. In the example of the storage device 100, the failure information has three importance levels i. The three importance levels i are represented by importance i of 0 to 2. The failure information with importance i of 0 is the most important failure information. The failure information with importance i of 2 is failure information with a low importance. The failure information with importance i of 1 is failure information with an importance lower than the failure information with importance of 0, and higher than the failure information with importance i of 2.

The storage device 100 in FIG. 2 is an example of the storage device 100 in an initial state. In the example of the storage device 100 in the initial state, the consecutive storage areas EI[0] to EI[2] are secured in advance to store failure information with importance i of 0. In the example of the storage device 100 in the initial state, the consecutive storage areas EI[3] to EI[5] are secured in advance to store failure information with importance i of 1. In the example of the storage device 100 in the initial state, the consecutive storage areas EI[6] to EI[8] are secured in advance to store failure information with importance i of 2.

The storage areas secured for failure information with importance i are managed by a pointer HEAD[i] in which an element number of a head storage area EI of the secured storage areas is set, and a pointer TAIL[i] in which an element number obtained by adding one (1) to an element number of a last storage area EI of occupied storage areas EI is set. That is, to TAIL[i], an element number of a next storage area EI, in which new failure information with importance i is to be stored, is set. A case where the same element number is set to both HEAD[i] and TAIL[i] indicates that no failure information with importance i has been stored. In the example of the present embodiment, any one of 0 to 9 corresponding to EI[0] to EI[9], respectively, is set to each of HEAD[i] and TAIL[i]. Unlike EI[0] to EI[8] of the storage device 100, EI[9] indicates outside of the storage device 100. For example, EI[9] is set for a case where failure information has been stored in the areas up to EI[8].

In the storage device 100 of FIG. 2, no failure information with importance i of 0 has been stored. Thus, EI[0] is set to both HEAD[0] and TAIL[0]. In the storage device 100 of FIG. 2, no failure information with importance i of 1 has been stored. Thus, EI[3] is set to both HEAD[1] and TAIL[1]. In the storage device 100 of FIG. 2, no failure information with importance i of 2 has been stored. Thus, EI[6] is set to both HEAD[2] and TAIL[2].

A storage device 100a of FIG. 2 is an example obtained after failure information #1 with importance i of 0 is stored in the storage device 100 in the initial state. Hereinafter, a process of newly storing failure information #1 with importance i of 0 from the initial state of the storage device 100 will be described.

(A1) The processor 210 starts a process of storing new failure information in a storage area EI set to TAIL[i].

(A2) Upon acquiring failure information with importance i, the processor 210 checks the location of TAIL[i]. In the storage device 100 of FIG. 2, EI[0] is set to TAIL[0]. Since the storage area of EI[0] has an element number that is not larger than that of EI[8], the failure information may be stored.

(A3) The processor 210 determines the importance of the acquired failure information with importance i. The importance i of the failure information #1 to be stored in the storage device 100a is 0, and thus, the failure information #1 is determined to have the highest importance.

(A4) The processor 210 determines whether the same element number is set to both TAIL[i] indicating the next storage area EI in which the acquired failure information with importance i is to be stored and HEAD[i+1] indicating a head storage area EI for failure information with importance i+1. A case where the same storage area EI is not set to TAIL[i] and HEAD[i+1] indicates that a free space exists in the storage areas secured in advance to store failure information with importance i. In the storage device 100 of FIG. 2, EI[0] is set to TAIL[0], and EI[3] is set to HEAD[1].

(A5) The processor 210 stores the acquired failure information with importance i in the storage area EI set to TAIL[i]. In the storage device 100a, new failure information #1 with importance i of 0 is stored in EI[0].

(A6) The processor 210 adds one (1) to the element number of the storage area EI set to TAIL[i]. In the storage device 100a, EI[1] is set to TAIL[0].

As described above, when a free space exists in the storage areas secured in advance for the failure information with importance i, the processor 210 stores the new failure information in the storage area EI set to TAIL[i].

Figure 3:
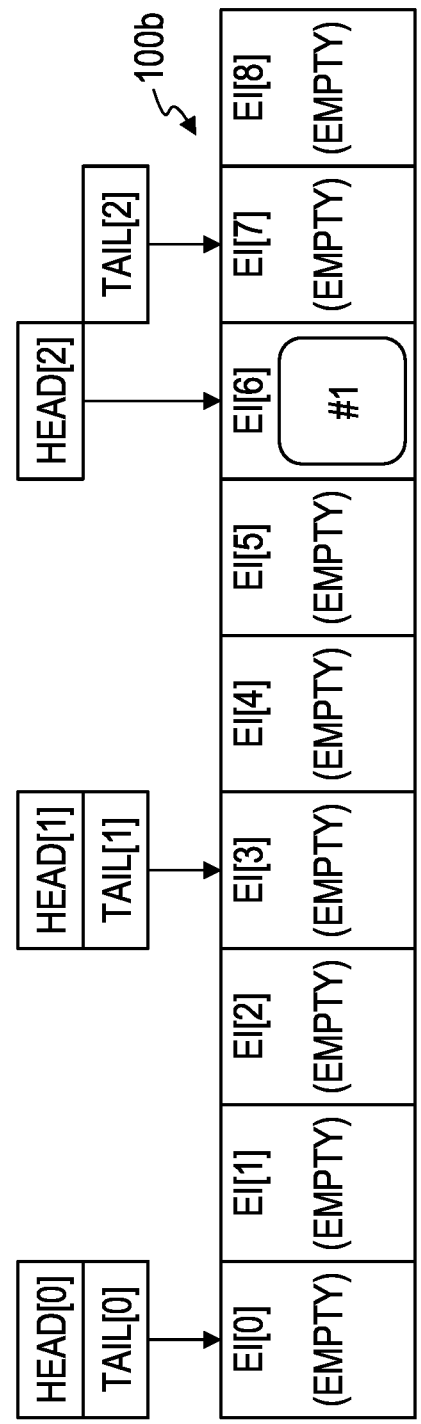
FIG. 3 is a diagram illustrating an example of a storage process of storing new failure information in a storage device.

FIG. 3 is a diagram illustrating an example of a storage process of storing new failure information in a storage device. A storage device 100b is an example obtained after the failure information #1 with importance i of 2 is stored in the storage device 100 of FIG. 2 in the initial state. Hereinafter, a process of newly storing failure information #1 with importance i of 2 from the initial state of the storage device 100 of FIG. 2 will be described.

(B1) The processor 210 starts a process of storing new failure information in a storage area EI set to TAIL[i].

(B2) Upon acquiring failure information with importance i, the processor 210 checks the location of TAIL[i]. In the storage device 100 of FIG. 2, EI[6] is set to TAIL[2]. Since the storage area of EI[6] has an element number that is not larger than that of EI[8], the failure information may be stored.

(B3) The processor 210 determines the importance of the acquired failure information with importance i. In the storage device 100b, failure information #1 with importance i of 2 is to be stored. The failure information with importance i of 2 is determined to have the lowest importance. When the importance of the acquired failure information is the lowest, HEAD[i+1] does not exist. Thus, an operation corresponding to (A4) is not performed.

(B4) The processor 210 stores the acquired failure information with importance i in the storage area EI set to TAIL[i]. In the storage device 100b, new failure information #1 with importance i of 2 is stored in EI[6].

(B5) The processor 210 adds one (1) to the element number of the storage area EI set to TAIL[i]. In the storage device 100b, EI[7] is set to TAIL[2].

As described above, when the least important failure information is acquired, the operation (A4) of checking HEAD[i+1] is omitted. When a free space exists in the storage areas secured in advance for the failure information with importance i, the processor 210 stores the new failure information in the storage area EI set to TAIL[i].

Figure 4:
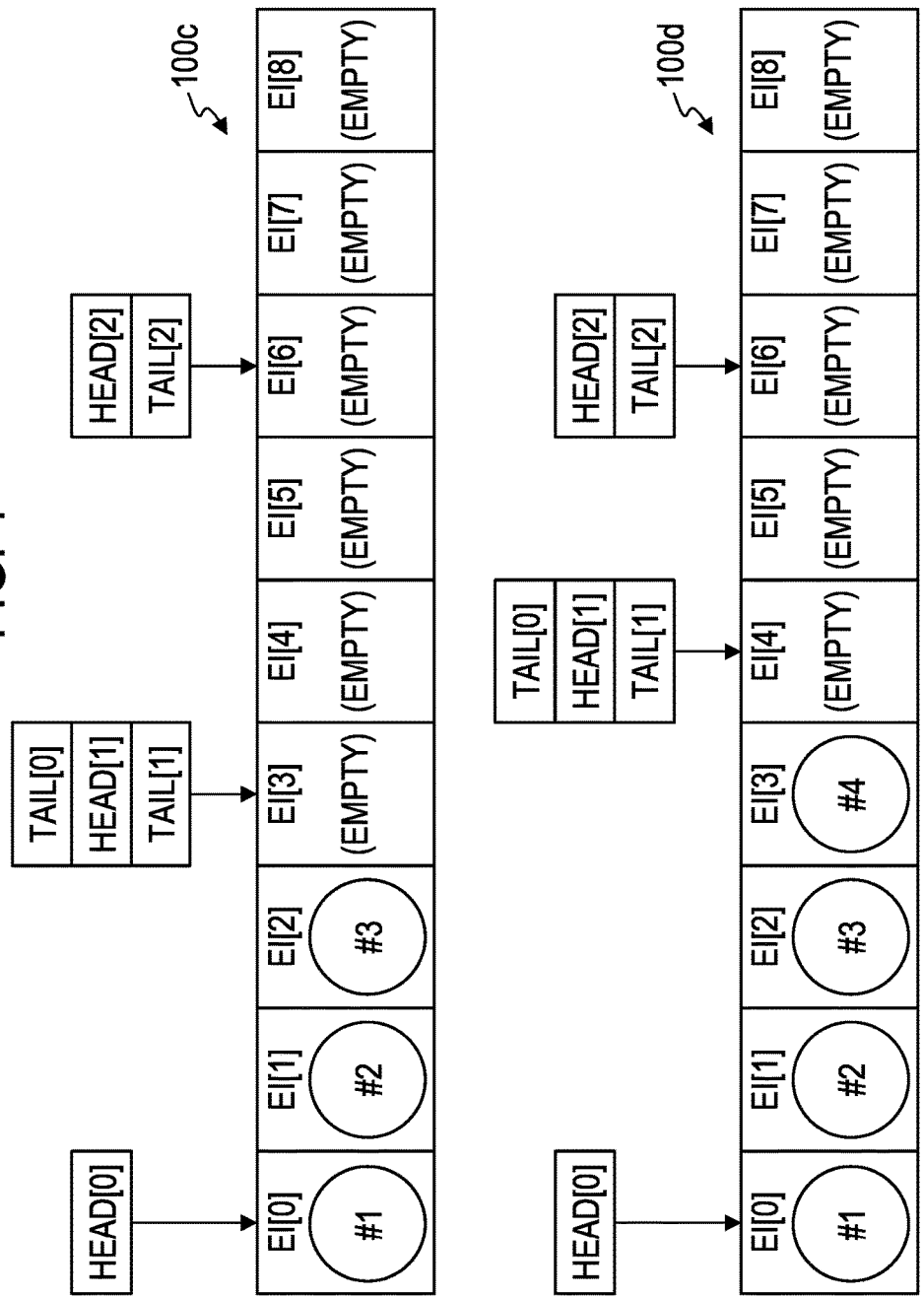
FIG. 4 is a diagram illustrating an example of a storage process of storing new failure information in a storage device.

FIG. 4 is a diagram illustrating an example of a storage process of storing new failure information in a storage device. A storage device 100c of FIG. 4 is an example obtained after failure information #1 to #3 with importance i of 0 is stored in the storage device 100 of FIG. 2 in the initial state. That is, the storage device 100c is an example obtained after the operations (A1) to (A6) are repeated three times from the initial state of the storage device 100. Therefore, EI[3] is set to TAIL[0] by adding three (3) to the element number indicating the storage area EI[0] which is set to TAIL[0] in the initial state.

A storage device 100d is an example obtained after failure information #4 with importance i of 0 is stored in the storage device 100c. Hereinafter, a process of newly storing failure information #4 with importance i of 0 from the state of the storage device 100c will be described.

(C1) The processor 210 starts a process of storing new failure information in a storage area EI set to TAIL[i].

(C2) Upon acquiring failure information with importance i, the processor 210 checks the location of TAIL[i]. In the storage device 100c, EI[3] is set to TAIL[0]. Since the storage area of EI[3] has an element number that is not larger than that of EI[8], the failure information may be stored.

(C3) The processor 210 determines the importance of the acquired failure information with importance i. The importance i of the failure information #4 to be stored in the storage device 100d is 0, and thus, the failure information #4 is determined to have the highest importance.

(C4) The processor 210 determines whether the same element number is set to both TAIL[i] indicating the next storage area EI in which the acquired failure information with importance i is to be stored and HEAD[i+1] indicating a head storage area ET for failure information with importance i+1. A case where the same storage area ET is set to both TARN and HEAD[i+1] indicates that storage areas secured in advance for the failure information with importance i are full. In the storage device 100c, EI[3] is set to both TAIL[0] and HEAD[1].

(C5) The processor 210 starts a process of checking HEAD and TAIL related to the storage areas of importance i+1 that is lower than importance i by one level.

(C5.1) The processor 210 checks locations of HEAD[i+1] and TAIL[i+1] for importance i+1 that is lower than importance i by one level. In the storage device 100c, EI[3] is set to both HEAD[1] and TAIL[1]. Thus, the processor 210 determines that failure information with importance i of 1 has not been stored.

(C5.2) The processor 210 determines whether the importance i+1 is the lowest importance. When the importance i+1 is not the lowest importance, the processor 210 determines whether the same element number is set to both TAIL[i+1] and HEAD[i+2]. The processor 210 determines that the importance i+1 is not the lowest importance. In the storage device 100c, EI[3] is set to TAIL[1], and EI[6] is set to HEAD[2]. Thus, the processor 210 may determine that a free space exists in the storage areas secured in advance to store failure information with importance i of 1.

(C5.3) The processor 210 adds one (1) to the element numbers of the storage areas EI set to HEAD[i+1] and TAIL[i+1]. As a result, as in the storage device 100d, EI[4] is set to both HEAD[i+1] and TAIL[i+1].

(C6) The processor 210 stores the acquired failure information with importance i in the storage area EI set to TAIL[i]. In the storage device 100d, new failure information #4 with importance i of 0 is stored in EI[3].

(C7) The processor 210 adds one (1) to the element number of the storage area EI set to TAIL[i]. In the storage device 100d, EI[4] is set to TAIL[0].

As described above, when EI[0] to EI[2] secured in advance for failure information with importance i of 0 are full, and a free space exists in EI[3] secured in advance for failure information with a lower importance i of 1, EI[3] is allocated to failure information with importance i of 0. Accordingly, the processor 210 may store new failure information with importance i of 0 in EI[3].

Figure 5:
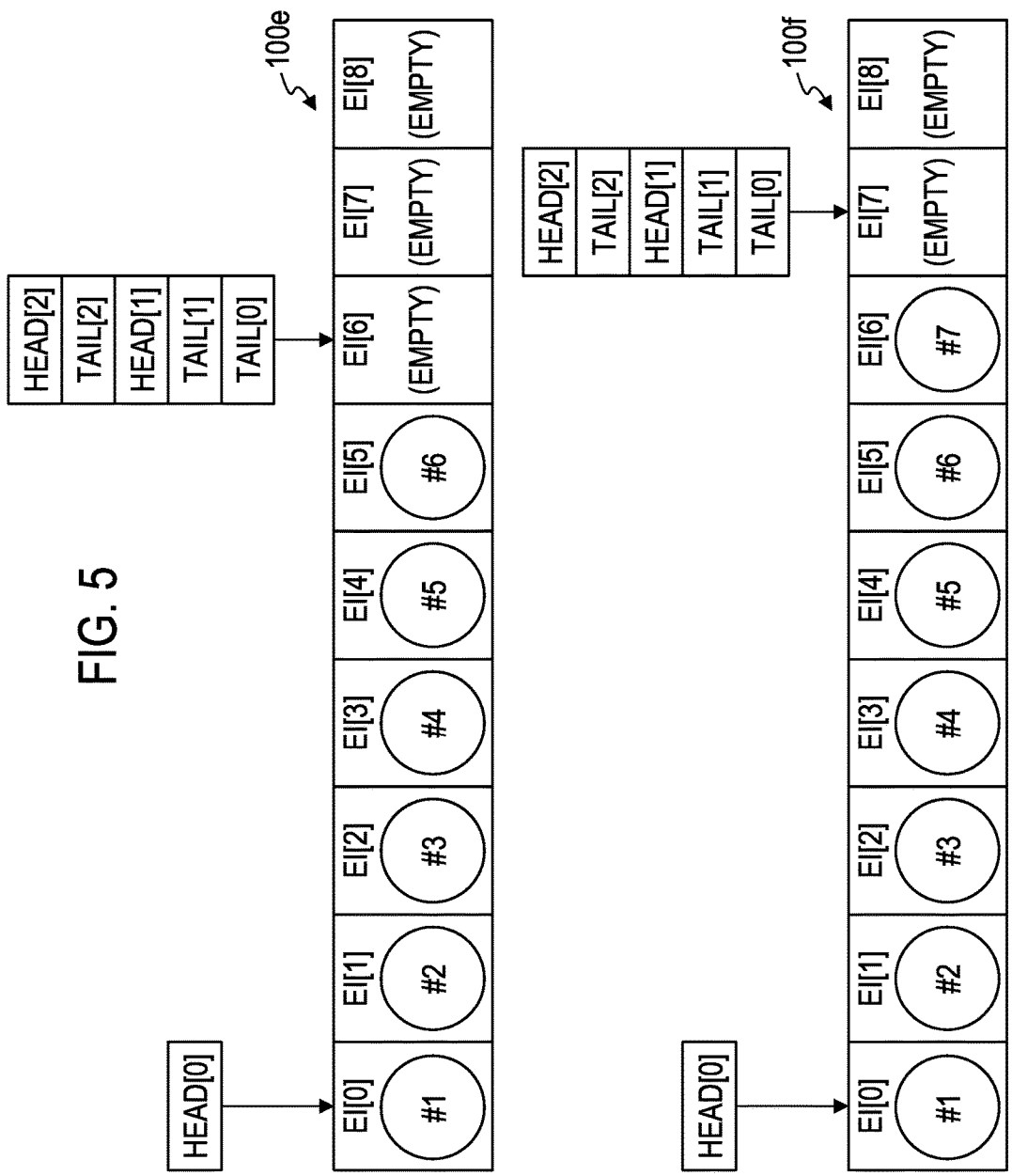
FIG. 5 is a diagram illustrating an example of a storage process of storing new failure information in a storage device.

FIG. 5 is a diagram illustrating an example of a storage process of storing new failure information in a storage device. A storage device 100e of FIG. 5 is an example obtained after failure information #4 to #6 with importance i of 0 is stored from the state of the storage device 100c of FIG. 4. That is, the storage device 100e is an example obtained after the operations (C1) to (C7) are repeated three times from the state of the storage device 100c. Therefore, EI[6] is set to TAIL[0], HEAD[1], and TAIL[1].

A storage device 100f is an example obtained after failure information #7 with importance i of 0 is stored in the storage device 100e. Hereinafter, a process of newly storing failure information #7 with importance i of 0 from the state of the storage device 100e will be described.

(D1) The processor 210 starts a process of storing new failure information in a storage area EI set to TAIL[i].

(D2) Upon acquiring failure information with importance i, the processor 210 checks the location of TAIL[i]. In the storage device 100e, EI[6] is set to TAIL[0]. Since the storage area of EI[6] has an element number that is not larger than that of EI[8], the failure information may be stored.

(D3) The processor 210 determines the importance of the acquired failure information with importance i. The importance i of the failure information #7 to be stored in the storage device 100f is 0, and thus, the failure information #7 is determined to have the highest importance.

(D4) The processor 210 determines whether the same element number is set to both TAIL[i] indicating the next storage area EI in which the acquired failure information with importance i is to be stored and HEAD[i+1] indicating a head storage area ET for failure information with importance i+1. A case where the same storage area ET is set to both TARN and HEAD[i+1] indicates that the storage areas secured in advance for the failure information with importance i are full. In the storage device 100e, EI[6] is set to both TAIL[0] and HEAD[1].

(D5) The processor 210 starts a process of checking HEAD and TAIL related to storage areas of importance i+1 that is lower than importance i by one level.

(D5.1) The processor 210 checks the locations of HEAD [i+1] and TAIL[i+1] for importance i+1 that is lower than importance i by one level. In the storage device 100e, EI[6] is set to both HEAD[1] and TAIL[1]. Thus, the processor 210 determines that failure information with importance i of 1 has not been stored.

(D5.2) The processor 210 determines whether the importance i+1 is the lowest importance. When the importance i+1 is not the lowest importance, the processor 210 determines whether the same element number is set to both TAIL[i+1] and HEAD[i+2]. The processor 210 determines that the importance i+1 is not the lowest importance. A case where the same storage area EI is set to both TAIL[i+1] and HEAD[i+2] indicates that the storage areas secured in advance for the failure information with importance i+1 are full or lost. In the storage device 100e, EI[6] is set to both TAIL[1] and HEAD[2].

(D6) The processor 210 starts a process of checking HEAD and TAIL related to storage areas of importance i+2 that is lower than importance i+1 by one level.

(D6.1) The processor 210 checks the locations of HEAD [i+2] and TAIL[i+2] for importance i+2 that is lower than importance i+1 by one level. In the storage device 100e, EI[6] is set to both HEAD[2] and TAIL[2]. Thus, the processor 210 determines that failure information with importance i of 2 has not been stored.

(D6.2) The processor 210 determines whether the importance i+2 is the lowest importance. The importance i+2 is the lowest importance. Thus, the process of checking HEAD and TAIL for each importance is completed.

(D6.3) The processor 210 adds one (1) to the element number of the storage area EI set to HEAD[i+2] and TAIL[i+2]. As a result, as in the storage device 100f, EI[7] is set to both HEAD[i+2] and TAIL[i+2].

(D7) The processor 210 adds one (1) to the element number of the storage area EI set to HEAD[i+1] and TAIL[i+1]. As a result, as in the storage device 100f, EI[7] is set to both HEAD[i+1] and TAIL[i+1].

(D8) The processor 210 stores the acquired failure information with importance i in the storage area EI set to TAIL[i]. In the storage device 100f, new failure information #7 with importance i of 0 is stored in EI[6].

(D9) The processor 210 adds one (1) to the element number of the storage area EI set to TAIL[i]. In the storage device 100f, EI[7] is set to TAIL[0].

Figure 6:
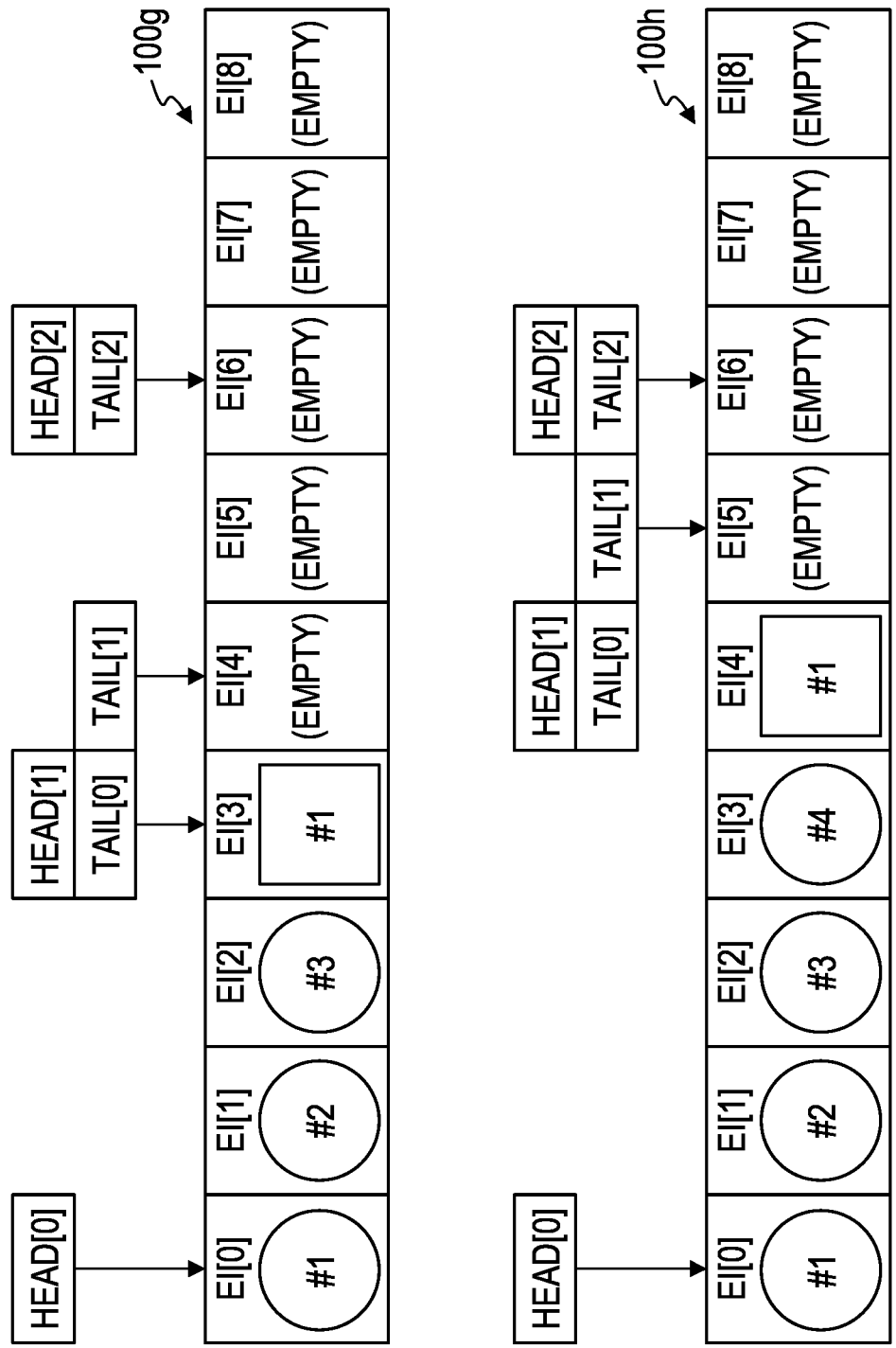
FIG. 6 is a diagram illustrating an example of a storage process of storing new failure information in a storage device.

FIG. 6 is a diagram illustrating an example of a storage process of storing new failure information in a storage device. The state of a storage device 100g of FIG. 6 is obtained after failure information #1 to #3 with importance i of 0 and failure information #1 with importance i of 1 is stored in the storage device 100 of FIG. 2 in the initial state. Failure information #1 to #3 with importance i of 0 is sequentially stored in EI[0] to EI[2]. Failure information #1 with importance i of 1 is stored in EI[3]. As a result, EI[0] is set to HEAD[0]. EI[3] is set to both TAIL[0] and HEAD [1]. EI[4] is set to TAIL[1]. EI[6] is set to both HEAD[2] and TAIL[2].

A storage device 100h is an example obtained after failure information #4 with importance i of 0 is stored in the storage device 100g. Hereinafter, a process of newly storing failure information #4 with importance i of 0 from the state of the storage device 100g will be described.

(E1) The processor 210 starts a process of storing new failure information in a storage area EI set to TAIL[i].

(E2) Upon acquiring failure information with importance i, the processor 210 checks the location of TAIL[i]. In the storage device 100g, EI[3] is set to TAIL[0]. Since the storage area of EI[3] has an element number that is not larger than that of EI[8], the failure information may be stored.

(E3) The processor 210 determines the importance of the acquired failure information with importance i. The importance i of the failure information #4 to be stored in the storage device 100h is 0, and thus, the failure information #4 is determined to have the highest importance.

(E4) The processor 210 determines whether the same element number is set to both TAIL[i] indicating the next storage area EI in which the acquired failure information with importance i is to be stored and HEAD[i+1] indicating a head storage area EI for failure information with importance i+1. A case where the same storage area EI is set to both TAIL[i] and HEAD[i+1] indicates that storage areas secured in advance for the failure information with importance i are full. In the storage device 100g, EI[3] is set to both TAIL[0] and HEAD[1].

(E5) The processor 210 starts a process of checking HEAD and TAIL related to storage areas of importance i+1 that is lower than importance i by one level.

(E5.1) The processor 210 checks the locations of HEAD [i+1] and TAIL[i+1] for importance i+1 that is lower than importance i by one level. In the storage device 100g, EI[3] is set to HEAD[1], and EI[4] is set to TAIL[1]. On the basis of the element numbers of the storage areas EI set to HEAD[1] and TAIL[1], it may be found that one piece of failure information with importance i of 1 has been stored in the storage device 100g.

(E6) The processor 210 starts a process of moving failure information with importance i+1 to a storage area EI set to TAIL[i+1].

(E6.1) The processor 210 checks the location of TAIL[i+ 1]. In the storage device 100g, EI[4] is set to TAIL[1]. Since the storage area of EI[4] has an element number that is not larger than that of EI[8], the failure information may be stored.

(E6.2) The processor 210 determines whether the importance i+1 is the lowest importance. The processor 210 determines that the importance i+1 is not the lowest importance.

(E6.3) When the importance i+1 is not the lowest importance, the processor 210 determines whether the same element number is set to both TAIL[i+1] and HEAD[i+2]. The processor 210 determines that different storage areas EI are set to TAIL[i+1] and HEAD[i+2]. This indicates that a free space exists in the storage areas secured in advance for the failure information with importance i+1.

(E6.4) The processor 210 moves failure information, that has been stored in the storage area EI set to HEAD[i+1] for importance i+1, to TAIL[i+1]. In the storage device 100h, failure information #1 with importance i of 1 that has been stored in EI[3] is moved to EI[4].

(E6.5) The processor 210 adds one (1) to the element number of the storage area EI set to TAIL[i+1]. As a result, as in the storage device 100h, EI[5] is set to TAIL[i+1].

(E7) The processor 210 adds one (1) to the element number of the storage area EI set to HEAD[i+1]. As a result, as in the storage device 100h, EI[4] is set to HEAD[i+1].

(E8) The processor 210 stores the acquired failure information with importance i in the storage area EI set to TAIL[i]. In the storage device 100h, new failure information #4 with importance i of 0 is stored in EI[3].

(E9) The processor 210 adds one (1) to the element number of the storage area EI set to TAIL[i]. In the storage device 100h, EI[4] is set to TAIL[0].

As described above, when EI[0] to EI[2] secured in advance for failure information with importance i of 0 are full and EI[3] secured in advance for failure information with a lower importance i of 1 is also occupied, failure information that has been stored in EI[3] is moved to another EI and EI[3] is allocated to failure information with importance i of 0. Accordingly, the processor 210 may store new failure information with importance i of 0 in EI[3].

Figure 7:
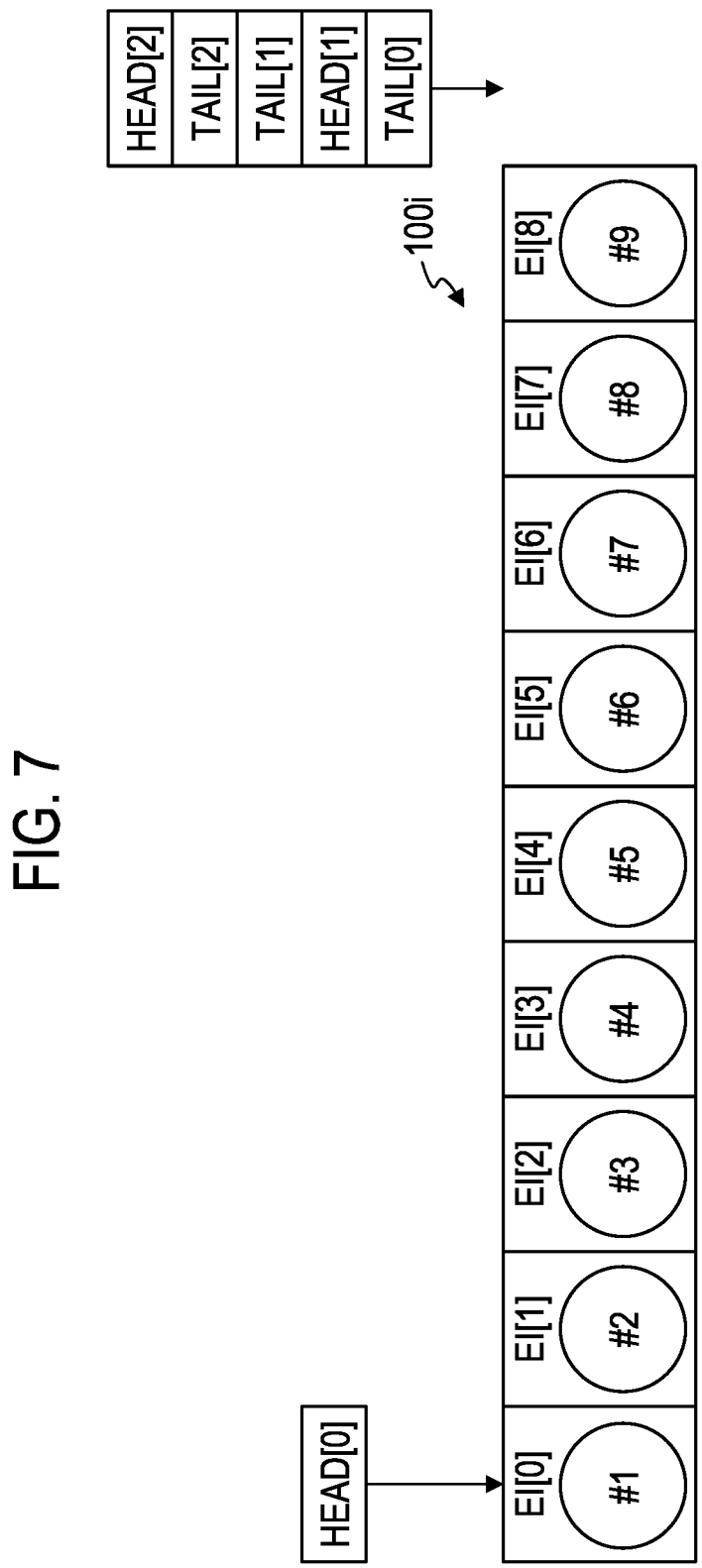
FIG. 7 is a diagram illustrating an example of a storage process of storing new failure information in a storage device.

FIG. 7 is a diagram illustrating an example of a storage process of storing new failure information in a storage device. The state of a storage device 100i of FIG. 7 is obtained after failure information #1 to #9 with importance i of 0 is stored in the storage device 100 of FIG. 2 in the initial state. Failure information #1 to #9 with importance i of 0 is sequentially stored in EI[0] to EI[8]. As a result, EI[0] is set to HEAD[0]. EI[9], which indicates that the areas up to EI[8] of the storage device 100i are completely occupied, is set to TAIL[0], HEAD[1], TAIL[1], HEAD[2], and TAIL[2].

Hereinafter, a process of newly storing failure information #10 with importance i of 0 in the storage device 100i will be described.

(F1) The processor 210 starts a process of storing new failure information in a storage area EI set to TAIL[i].

(F2) Upon acquiring failure information with importance i, the processor 210 checks the location of TAIL[i]. In the storage device 100i, EI[9] is set to TAIL[0]. Since the element number of EI[9] is larger than that of the storage area of EI[8], the processor 210 determines that the failure information is unable to be stored at TAIL[i] side any more.

(F3) The processor 210 starts a process of adding the failure information at HEAD[i] side.

(F4) The processor 210 determines whether the element number of the storage area EI set to HEAD[i] is EI[0]. Since EI[0] is set to HEAD[i] in the storage device 100i, the processor 210 determines that the failure information is unable to be stored at HEAD[i] side as well.

As a result of (F1) to (F4), although new failure information #10 with importance i is acquired, when the storage device 100 is full of failure information with the highest importance i of 0, the new failure information is not stored. When plural pieces of failure information are stored in the storage device 100, older failure information tends to be often highly related to a failure cause. Thus, in the present embodiment, older failure information is preferentially left.

Subsequently, a process of newly storing failure information #1 with importance i of 1 in the storage device 100i will be described.

(G1) The processor 210 starts a process of storing new failure information in a storage area EI set to TAIL[i].

(G2) Upon acquiring failure information with importance i, the processor 210 checks the location of TAIL[i]. In the storage device 100i, EI[9] is set to TAIL[1]. Since the element number of EI[9] is larger than that of the storage area of EI[8], the processor 210 determines that the failure information is unable to be stored at TAIL[i] side any more.

(G3) The processor 210 starts a process of adding the failure information to HEAD[i] side.

(G4) The processor 210 determines whether the element number of the storage area EI set to HEAD[i] is EI[0]. Since in the storage device 100i, EI[9] is set to HEAD[i], the processor 210 assumes that an area for storing failure information still exists at the side of storage areas EI[0] to EI[8], and continues to perform the process of storing the failure information at the HEAD[i] side.

(G5) The processor 210 determines whether the importance i is the highest importance. The processor 210 determines that the importance i is not the highest importance.

(G6) The processor 210 determines whether the same element number is set to both HEAD[i] and TAIL[i−1]. Since EI[9] is set to both HEAD[1] and TAIL[0] in the storage device 100i, it may be determined that failure information has been stored in storage areas up to EI set to TAIL[i−1].

(G7) The processor 210 starts a process of checking HEAD and TAIL related to storage areas of importance i−1 that is higher than importance i by one level.

(G7.1) The processor 210 determines whether the element number of the storage area EI set to HEAD[i−1] is 0. When EI[0] is set to HEAD[i−1], the processor 210 determines that failure information is unable to be stored at HEAD[i] side.

As a result of (G1) to (G7.1), although new failure information #1 with importance i+1 is acquired, when the storage device 100 is full of failure information with the highest importance i of 0, the new failure information is not stored. In the storage device 100 according to the present embodiment, failure information with the highest importance may be stored and left.

Figure 8:
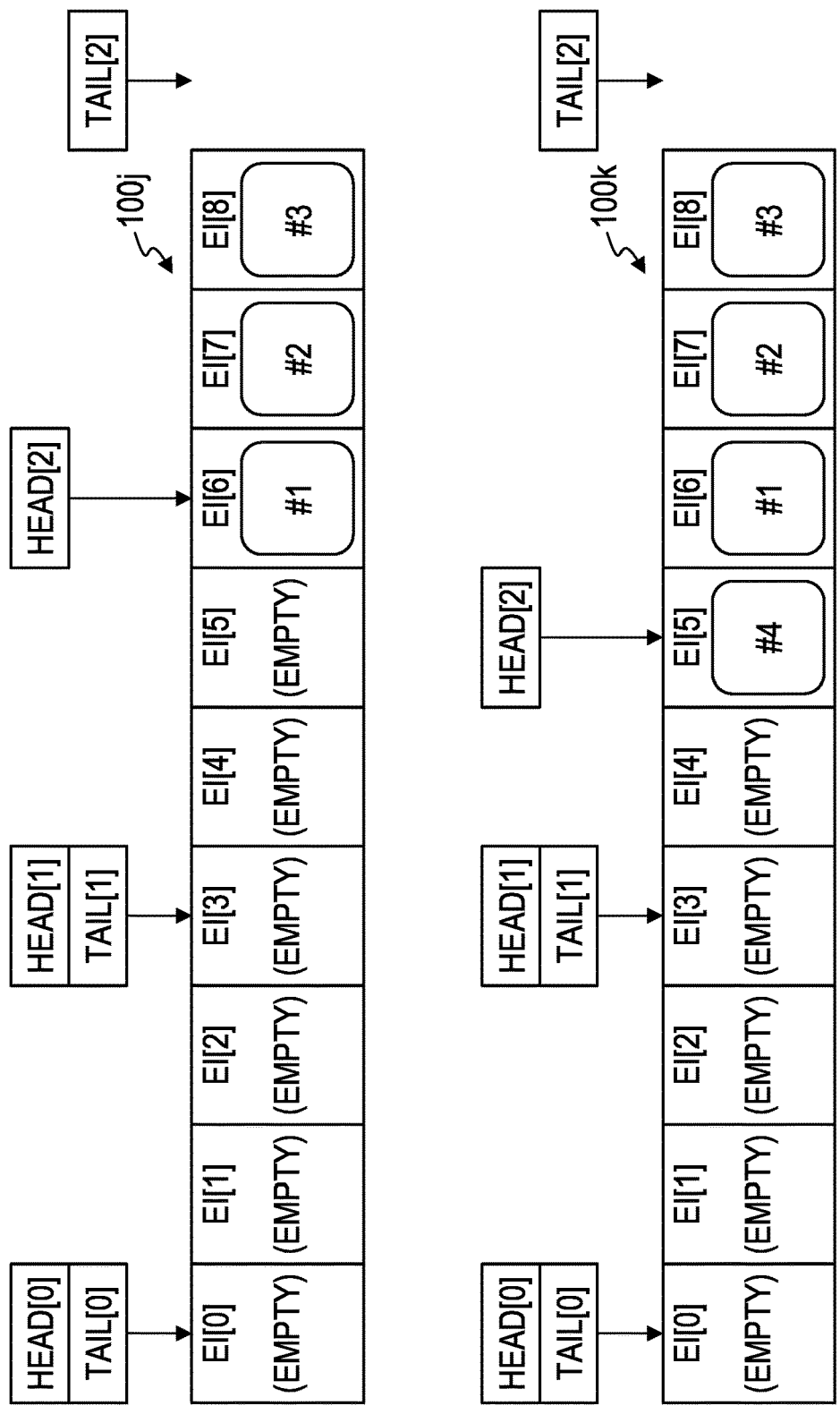
FIG. 8 is a diagram illustrating an example of a storage process of storing new failure information in a storage device.

FIG. 8 is a diagram illustrating an example of a storage process of storing new failure information in a storage device. The state of a storage device 100j of FIG. 8 is obtained after failure information #1 to #3 with importance i of 2 is stored in the storage device 100 of FIG. 2 in the initial state. Failure information #1 to #3 with importance i of 2 is sequentially stored in EI[6] to EI[8]. Since no failure information with importance i of 0 has been stored, EI[0] is set to both HEAD[0] and TAIL[0]. Since no failure information with importance i of 1 has been stored, EI[3] is set to both HEAD[1] and TAIL[1]. Since failure information #1 to #3 with importance i of 2 is stored, EI[6] is set to HEAD[2], and EI[9], which indicates that the areas up to EI[8] are completely occupied, is set to TAIL[2].

A storage device 100*k* is an example obtained after failure information #4 with importance i of 2 is newly stored from the state of the storage device 100*j*. Hereinafter, a process of newly storing failure information #4 with importance i of 2 from the state of the storage device 100*j* will be described.

(H1) The processor 210 starts a process of storing new failure information in a storage area EI set to TAIL[i].

(H2) Upon acquiring failure information with importance i, the processor 210 checks the location of TAIL[i]. In the storage device 100*j*, EI[9] is set to TAIL[2]. Since the element number of EI[9] is larger than that of the storage area of EI[8], the processor 210 determines that the failure information is unable to be stored at TAIL[i] side any more.

(H3) The processor 210 starts a process of adding the failure information to HEAD[i] side.

(H4) The processor 210 determines whether the element number of the storage area EI set to HEAD[i] is EI[0]. Since EI[6] is set to HEAD[i] in the storage device 100*j*, the processor 210 assumes that an area for storing failure information still exists at the side of storage areas EI[0] to EI[5], and continues to perform the process.

(H5) The processor 210 determines whether the importance i is the highest importance. The processor 210 determines that the importance i is not the highest importance.

(H6) The processor 210 determines whether the same element number is set to both HEAD[i] and TAIL[i−1]. In the storage device 100*j*, EI[6] is set to HEAD[2], and EI[3] is set to TAIL[1]. Thus, the processor 210 may determine that a free area exists in EI[3] to EI[5].

(H7) The processor 210 stores new failure information in a storage area EI indicated by an element number obtained by subtracting one (1) from the element number indicating the storage area EI set to HEAD[i]. As illustrated in the storage device 100*k*, the processor 210 stores the acquired failure information #4 with importance i of 2 in the storage area EI[5] just before EI[6] set to HEAD[2].

(H8) The processor 210 subtracts one (1) from the element number of the storage area EI set to HEAD[i]. In the storage device 100*k*, EI[5] is set to HEAD[i].

As described above, when a space exists within the storage device 100, failure information with even a low importance may be stored without being discarded.

Figure 9:
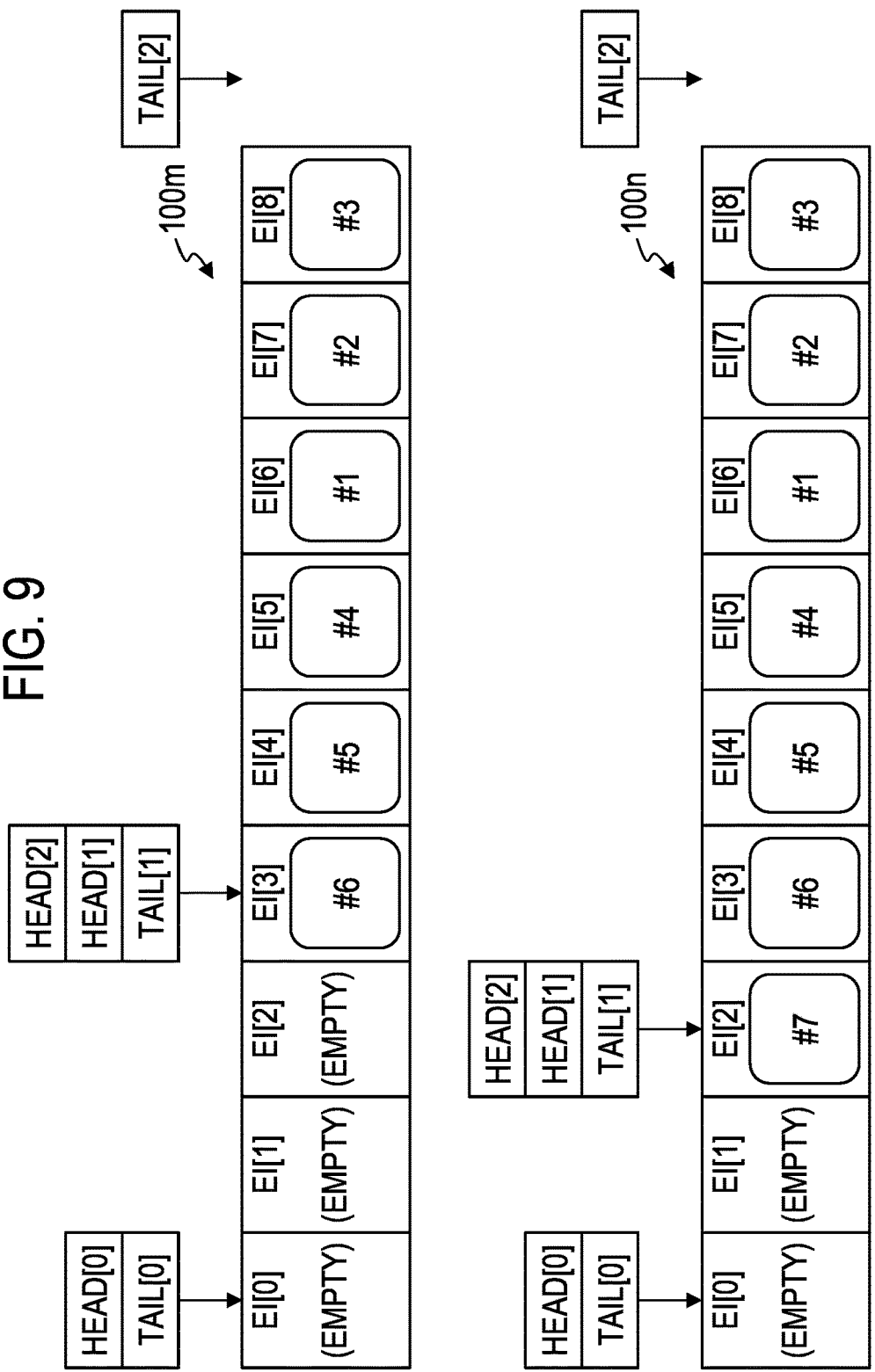
FIG. 9 is a diagram illustrating an example of a storage process of storing new failure information in a storage device.

FIG. 9 is a diagram illustrating an example of a storage process of storing new failure information in a storage device. The state of a storage device 100*m* is obtained after failure information #1 to #6 with importance i of 2 is stored in the storage device 100 of FIG. 2 in the initial state. Failure information #1 to #3 with importance i of 2 is sequentially stored in EI[6] to EI[8]. Next, failure information #4 to #6 with importance i of 2 is sequentially stored in EI[5] to EI[3]. Since no failure information with importance i of 0 has been stored, EI[0] is set to both HEAD[0] and TAIL[0]. Since no failure information with importance i of 1 has been stored, EI[3] is set to both HEAD[1] and TAIL[1]. Since failure information #1 to #6 with importance i of 2 is stored, EI[3] is set to HEAD[2] and EI[9], which indicates that the areas up to EI[8] are completely occupied, is set to TAIL[2].

A storage device 100*n* is an example obtained after failure information #7 with importance i of 2 is newly stored from the state of the storage device 100*m*. Hereinafter, a process of newly storing failure information #7 with importance i of 2 from the state of the storage device 100*m* will be described.

(I1) The processor 210 starts a process of storing new failure information in a storage area EI set to TAIL[i].

(I2) Upon acquiring failure information with importance i, the processor 210 checks the location of TAIL[i]. In the storage device 100*m*, EI[9] is set to TAIL[2]. Since the element number of EI[9] is larger than that of the storage area of EI[8], the processor 210 determines that failure information is unable to be stored at TAIL[i] side any more.

(I3) The processor 210 starts a process of adding the failure information to HEAD[i] side.

(I4) The processor 210 determines whether the element number of the storage area EI set to HEAD[i] is EI[0]. Since EI[3] is set to HEAD[i] in the storage device 100*m*, the processor 210 assumes that an area for storing the failure information still exists at the side of storage areas EI[0] to EI[2], and continues to perform the process.

(I5) The processor 210 determines whether the importance i is the highest importance. The processor 210 determines that the importance i is not the highest importance.

(I6) The processor 210 determines whether the same element number is set to both HEAD[i] and TAIL[i−1]. In the storage device 100*m*, EI[3] is set to both HEAD[2] and TAIL[1]. Thus, the processor 210 may determine that no free space exists in storage areas EI secured in advance to store failure information with importance i of 1.

(I7) The processor 210 starts a process of checking HEAD and TAIL related to storage areas of importance i−1 that is higher than importance i by one level.

(I7.1) The processor 210 determines whether the element number of the storage area EI set to HEAD[i−1] is 0. Since EI[3] is set to HEAD[i−1] in the storage device 100*m*, the processor 210 assumes that an area for storing failure information still exists at the side of storage areas EI[0] to EI[2], and continues to perform the process.

(I7.2) The processor 210 determines whether the same element number is set to both HEAD[i−1] and TAIL[i−1]. In the storage device 100*m*, EI[3] is set to both HEAD[i−1] and TAIL[i−1]. Thus, the processor 210 may determine that no failure information with importance i−1 has been stored.

(I7.3) The processor 210 determines whether the importance i−1 is the highest importance. When the importance i−1 is not the highest importance, the processor 210 determines whether the same element number is set to both HEAD[i−1] and TAIL[i−2]. The processor 210 determines that the importance i−1 is not the highest importance. In the storage device 100*m*, EI[3] is set to HEAD[i−1], and EI[0] is set to TAIL[i−2]. Thus, the processor 210 may determine that a free space exists at the side of storage areas EI[0] to EI[2].

(I7.4) The processor 210 subtracts one (1) from the element number of the storage area EI set to TAIL[i−1] and HEAD[i−1]. In the storage device 100*n*, EI[2] is set to both TAIL[i−1] and HEAD[i−1].

(I8) The processor 210 stores new failure information #7 with importance i in a storage area EI indicated by an element number obtained by subtracting one (1) from the element number indicating the storage area EI set to HEAD[i]. In the storage device 100*n*, the processor 210 stores the new failure information #7 with importance i in EI[2] indicated by an element number obtained by subtracting one (1) from the element number indicating EI[3] set to HEAD[2].

(I9) The processor 210 subtracts one (1) from the element number of the storage area EI set to HEAD[i]. In the storage device 100*n*, EI[2] is set to HEAD[i].

Figure 10:
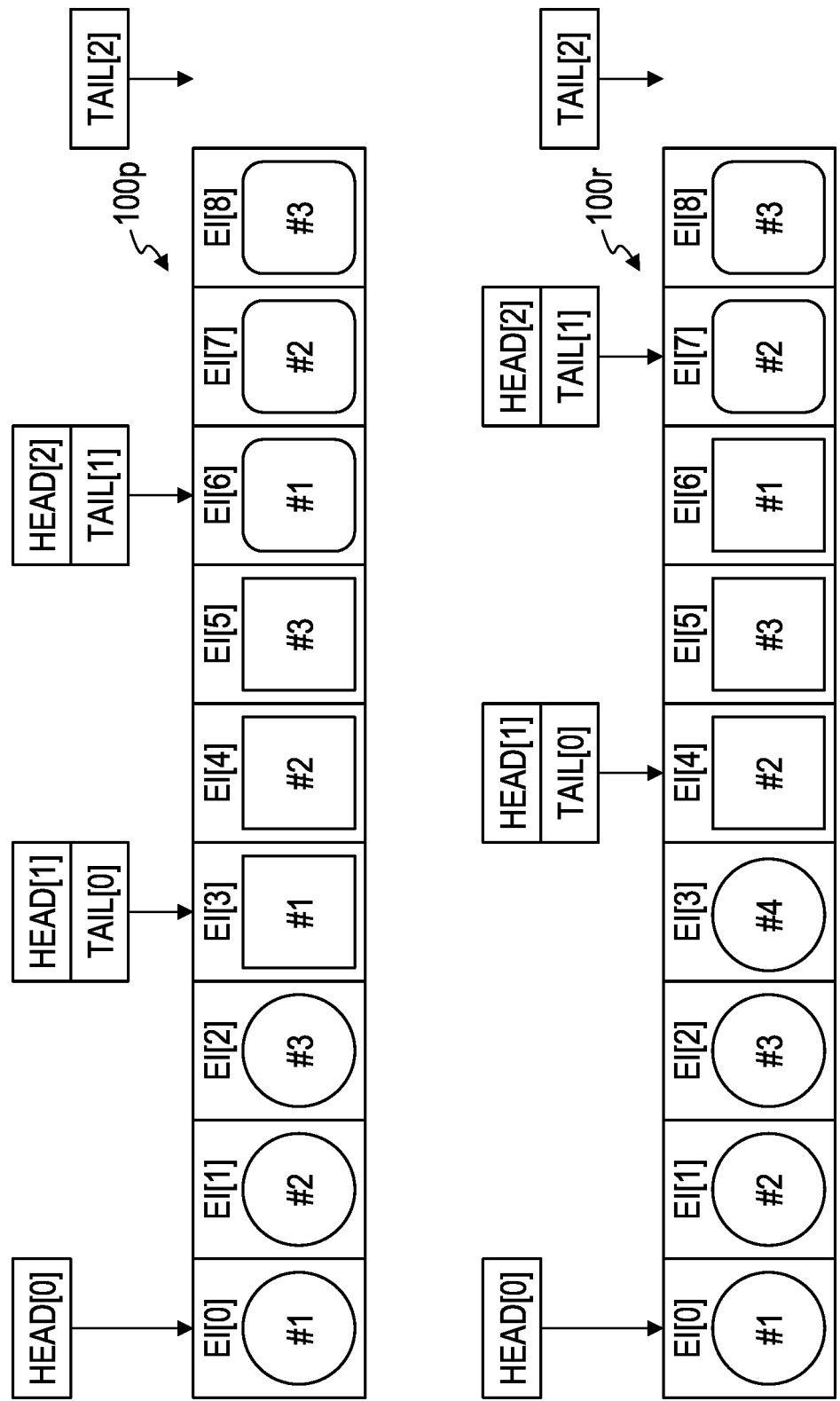
FIG. 10 is a diagram illustrating an example of a storage process of storing new failure information in a storage device.

FIG. 10 is a diagram illustrating an example of a storage process of storing new failure information in a storage device. A storage device 100*p* is an example of a storage device when three pieces of failure information with importance i of each of 0, 1, and 2 are stored in the storage device 100 of FIG. 2 in the initial state.

When failure information #1 to #3 with importance i of 2 is stored in the storage device 100 in the initial state where no failure information has been stored in any of EI[0] to EI[8], the failure information #1 to #3 is stored in consecutive storage areas EI[6] to EI[8]. Also, even when failure information has already been stored in any of EI[0] to EI[5], the failure information #1 to #3 with importance i of 2 is stored in the consecutive storage areas EI[6] to EI[8]. This is because EI[6] is set to both HEAD[2] and TAIL[2] for importance i of 2 in the storage device 100 in the initial state. When the failure information #1 to #3 with importance i of 2 is stored, the failure information is sequentially stored in the storage areas starting from EI[6] set to HEAD[2]. When the failure information with importance i of 2 is stored in areas up to EI[8], EI[9] is set to TAIL[2] to indicate that areas up to EI[8] of the storage device 100p are occupied.

When failure information #1 to #3 with importance i of 1 is stored, the failure information #1 to #3 is stored in the consecutive storage areas EI[3] to EI[5]. More specifically, since EI[3] is set to HEAD[1] for importance i of 1 in the storage device 100 in the initial state, the failure information is sequentially stored in areas starting from EI[3]. When the failure information with importance i of 1 is stored in areas up to EI[5], EI[6] is set to TAIL[1].

When failure information #1 to #3 with importance i of 0 is stored, the failure information #1 to #3 is stored in the consecutive storage areas EI[0] to EI[2]. More specifically, since EI[0] is set to HEAD[0] for importance i of 0 in the storage device 100 in the initial state, the failure information is sequentially stored in the areas starting from EI[0]. When the failure information with importance i of 0 is stored in the areas up to EI[2], EI[3] is set to TAIL[0].

As described above, in the storage device 100, areas for storing three pieces of failure information with each of importance levels i are secured in advance. Thus, until three pieces of failure information with each of importance levels i are acquired, the processor 210 may specify TAIL[i] to store the failure information in the specified TAIL in the storage device 100.

A storage device 100r is an example of a storage device after failure information #4 with importance i of 0 is newly stored from the state of the storage device 100p. In the state of the storage device 100p, failure information has already been stored in areas EI[0] to EI[8]. Thus, in order to newly store the failure information #4 with importance i of 0 in the storage device, any one of pieces of failure information must be overwritten. Hereinafter, a process of newly storing the failure information #4 with importance i of 0 from the state of the storage device 100p will be described.

(J1) The processor 210 starts a process of storing new failure information in a storage area EI set to TAIL[i].

(J2) Upon acquiring failure information with importance i, the processor 210 checks the location of TAIL[i]. In the storage device 100p, EI[3] is set to TAIL[0]. Since the storage area of EI[3] has an element number that is not larger than that of EI[8], the failure information may be stored.

(J3) The processor 210 determines the importance of the acquired failure information with importance i. The importance i of the failure information #4 to be stored in the storage device 100r is 0, and thus, the failure information #4 is determined to have the highest importance.

(J4) The processor 210 determines whether the same element number is set to both TAIL[i] indicating the next storage area EI in which the acquired failure information with importance i is to be stored and HEAD[i+1] indicating a head storage area EI for failure information with importance i+1. A case where the same storage area EI is set to both TAIL[i] and HEAD[i+1] indicates that the storage areas secured in advance for the failure information with importance i are full. In the storage device 100p, EI[3] is set to both TAIL[0] and HEAD[1].

(J5) The processor 210 starts a process of checking HEAD and TAIL related to storage areas of importance i+1 that is lower than importance i by one level.

(J6) The processor 210 checks the location of HEAD[i+1] and TAIL[i+1] for importance i+1 that is lower than importance i by one level. In the storage device 100p, EI[3] is set to HEAD[1], and EI[6] is set to TAIL[1]. On the basis of the element numbers of the storage areas EI set to HEAD[1] and TAIL[1], the processor 210 determines that failure information with importance i+1 has been stored in EI[3] to EI[5].

(J7) The processor 210 starts a process of moving failure information with importance i+1 to a storage area EI set to TAIL[i+1].

(J7.1) The processor 210 checks the location of TAIL[i+1]. In the storage device 100p, EI[6] is set to TAIL[1]. Since the storage area of EI[6] has an element number that is not larger than that of EI[8], the failure information may be stored.

(J7.2) The processor 210 determines the importance of the importance i+1. The processor 210 determines that the importance i+1 is not the lowest importance.

(J7.3) The processor 210 determines whether the same element number is set to both TAIL[i+1] and HEAD[i+2]. In the storage device 100p, EI[6] is set to both TAIL[1] and HEAD[2]. Thus, the processor 210 may determine that storage areas secured to store failure information with importance i+1 have already been full.

(J8) The processor 210 starts a process of checking HEAD and TAIL related to storage areas of importance i+2 that is lower than importance i+1 by one level.

(J9) The processor 210 checks the location of HEAD[i+2] and TAIL[i+2] for importance i+2 that is lower than importance i+1 by one level. In the storage device 100p, EI[6] is set to HEAD[2], and EI[9] is set to TAIL[2]. On the basis of the element numbers of the storage areas EI set to HEAD[2] and TAIL[2], the processor 210 determines that failure information with importance i+2 has been stored in EI[6] to EI[8].

(J10) The processor 210 starts a process of moving failure information with importance i+2 to a storage area EI set to TAIL[i+2].

(J10.1) The processor 210 checks the location of TAIL[i+2]. In the storage device 100p, EI[9] is set to TAIL[2]. Since the element number of EI[9] is larger than that of the storage area of EI[8], the processor 210 determines that failure information is unable to be stored at TAIL[i+2] side any more.

(J11) The processor 210 starts a process of moving failure information with importance i+2 to HEAD[i+2] side.

(J12) The processor 210 determines whether the element number of the storage area EI set to HEAD[i+2] is EI[0]. Since EI[6] is set to HEAD[i+2] in the storage device 100p, the processor 210 assumes that an area for storing failure information still exists at the side of storage areas EI[0] to EI[5], and continues to perform the process of storing the failure information at HEAD[i+2] side.

(J13) The processor 210 determines whether the importance i+2 is the highest importance. The processor 210 determines that the importance i+2 is not the highest importance.

(J14) The processor 210 determines whether the same element number is set to both HEAD[i+2] and TAIL[i+1]. In the storage device 100p, EI[6] is set to both HEAD[2] and TAIL[1]. The processor 210 may determine that failure information has already been stored in the areas up to EI[6] set to TAIL[1].

(J15) The processor 210 starts a process of checking HEAD and TAIL related to the storage areas of importance i+1 that is higher than importance i+2 by one level.

(J16) The processor 210 determines whether the element number of the storage area EI set to HEAD[i+1] is 0. Since EI[3] is set to HEAD[i+1] in the storage device 100p, the processor 210 assumes that an area for storing failure information still exists at the side of storage areas EI[0] to EI[2], and continues to perform the process.

(J17) The processor 210 determines whether the same element number is set to both HEAD[i+1] and TAIL[i+1]. Since different element numbers are set to HEAD[i+1] and TAIL[i+1] in the storage device 100p, the processor 210 determines that storage areas secured to store failure information with importance i+1 have already been full.

(J18) The processor 210 starts a process of moving failure information with importance i+1 to HEAD[i+1] side.

(J18.1) The processor 210 determines whether the element number of the storage area EI set to HEAD[i+1] is EI[0]. Since EI[3] is set to HEAD[i+1] in the storage device 100p, the processor 210 assumes that an area for storing failure information still exists at the side of storage areas EI[0] to EI[2], and continues to perform the process of storing the failure information at HEAD[i+1] side.

(J18.2) The processor 210 determines whether the importance i+1 is the highest importance. The processor 210 determines that the importance i+1 is not the highest importance.

(J18.3) The processor 210 determines whether the same element number is set to both HEAD[i+1] and TAIL[i]. Since EI[3] is set to both HEAD[1] and TAIL[0] in the storage device 100p, the processor 210 may determine that failure information with importance i has been stored in areas up to EI[2].

(J19) The processor 210 starts a process of checking HEAD and TAIL related to storage areas of importance i that is higher than importance i+1 by one level.

(J20) The processor 210 determines whether the element number of the storage area EI set to HEAD[i] is 0. When EI[0] is set to HEAD[i], the processor 210 determines that failure information is unable to be stored in HEAD[i] side.

(J21) The processor 210 adds one (1) to the element number of the storage area EI set to HEAD[i+2]. As a result, as in the storage device 100r, EI[7] is set to HEAD[i+2].

(J22) The processor 210 moves failure information, that has been stored in the storage area EI set to HEAD[i+1] for importance i+1, to TAIL[i+1]. In the storage device 100p, failure information #1 with importance i of 1 that has been stored in EI[3] is moved to EI[6]. The failure information #1 with importance i of 2 that has been stored in EI[6] is overwritten.

(J23) The processor 210 adds one (1) to the element number of the storage area EI set to TAIL[i+1]. In the storage device 100r, EI[7] is set to TAIL[i+1].

(J24) The processor 210 adds one (1) to the element number of the storage area EI set to HEAD[i+1]. In the storage device 100r, EI[4] is set to HEAD[i+1].

(J25) The processor 210 stores the acquired failure information with importance i in the storage area EI set to TAIL[i]. In the storage device 100r, new failure information #4 with importance i of 0 is stored in EI[3].

(J26) The processor 210 adds one (1) to the element number of the storage area EI set to TAIL[i]. In the storage device 100r, EI[4] is set to TAIL[i].

Since the failure information #1 with importance i of 1, which has been stored in HEAD[i+1](EI[3]) for importance i+1 that is lower than importance i by one level, is moved to TAIL[i+1](EI[6]), the storage area EI[3] becomes empty. At this time, failure information with the lowest importance i+2 is overwritten. Accordingly, failure information with a high importance may be stored in the storage device 100, and failure information with a low importance is overwritten. Thus, in order to leave the failure information with the high importance, the storage device 100 may be efficiently used.

Figure 11:
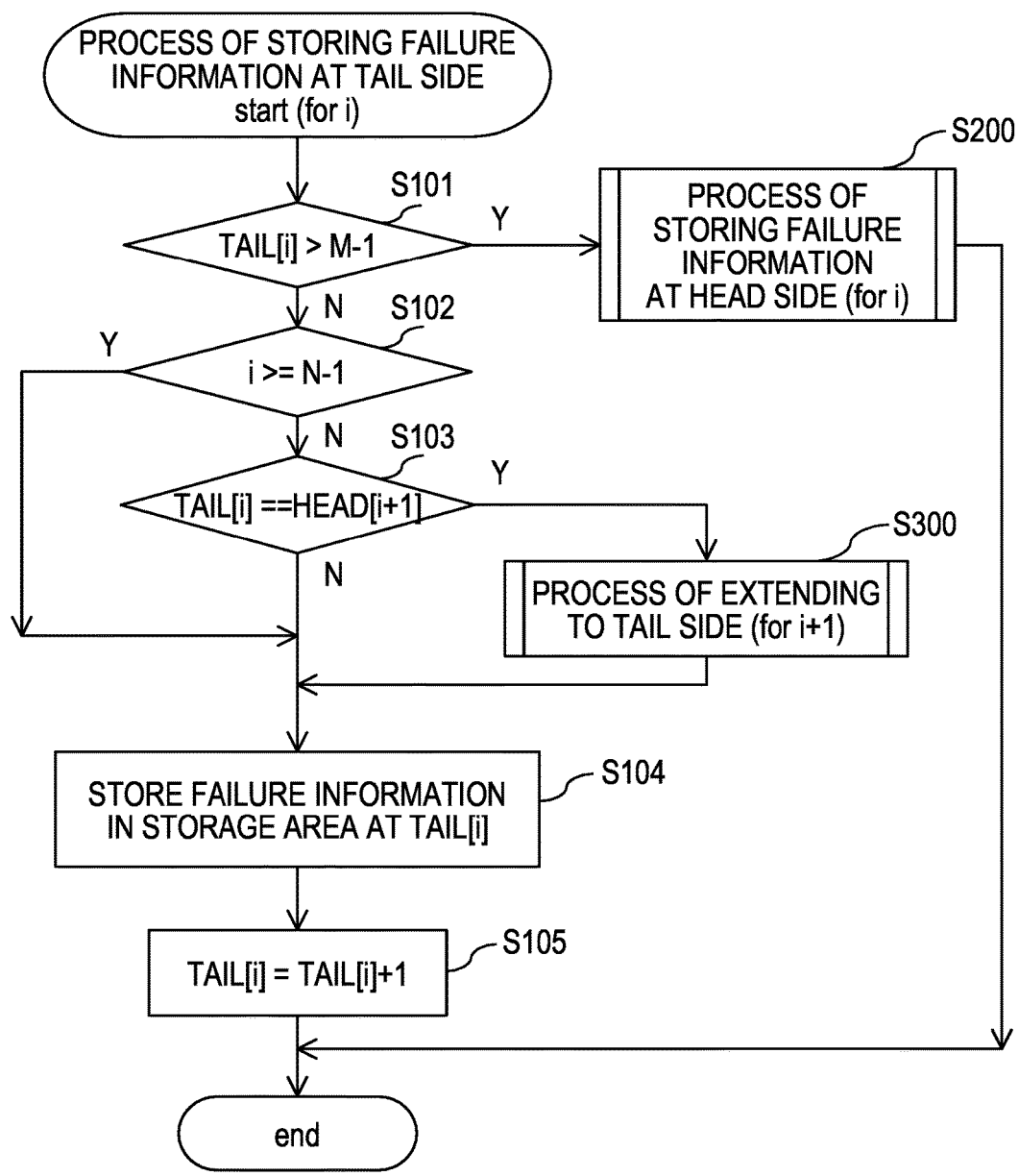
FIG. 11 is a flowchart illustrating an example of a process of storing failure information at TAIL side.

FIG. 11 is a flowchart illustrating an example of a process of storing failure information at TAIL side. In FIG. 11, the importance i is any one of importance levels 0 to 2. The processor 210 starts a process of storing new failure information in a storage area EI set to TAIL[i]. When failure information with importance i is acquired, the processor 210 determines whether an element number set to TAIL[i] is larger than M−1 (S101). Here, M is the number of storage areas. Specifically, M, which indicates the number of storage areas EI[0] to EI[8], is nine (9). When the processor 210 determines that the element number set to TAIL[i] is larger than M−1 ("YES" in S101), the processor 210 performs a process (to be described later with reference to FIG. 12) of storing the failure information at HEAD[i] side (S200). When S200 is completed, the processor 210 ends the process of storing the failure information in the storage device 100.

When the processor 210 determines that the element number set to TAIL[i] is not larger than M−1 ("NO" in S101), the processor 210 determines whether the importance i of the acquired failure information is N−1 or more (S102). Here, N indicates the number of importance levels. In the present embodiment, the number N of importance levels is three (3). When the processor 210 determines that the importance i of the acquired failure information is smaller than N−1 (that is, the importance i is not the lowest importance), the processor 210 determines whether the same element number is set to both TAIL[i] and HEAD[i+1] (S103). When the processor 210 determines that the same element number is set to both TAIL[i] and HEAD[i+1] ("YES" in S103), the processor 210 performs a process (to be described later with reference to FIG. 13) of extending to TAIL side (S300). When the processor 210 determines that the same element number is not set to TAIL[i] and HEAD [i+1] ("NO" in S103), the processor 210 stores the failure information in the storage area EI set to TAIL[i] (S104). S104 is also performed in the case of "YES" in S102, and also performed after S300. The processor 210 adds one (1) to the element number set to TAIL[i] (S105). When S105 is completed, the processor 210 ends the process of storing the failure information.

Figure 12:
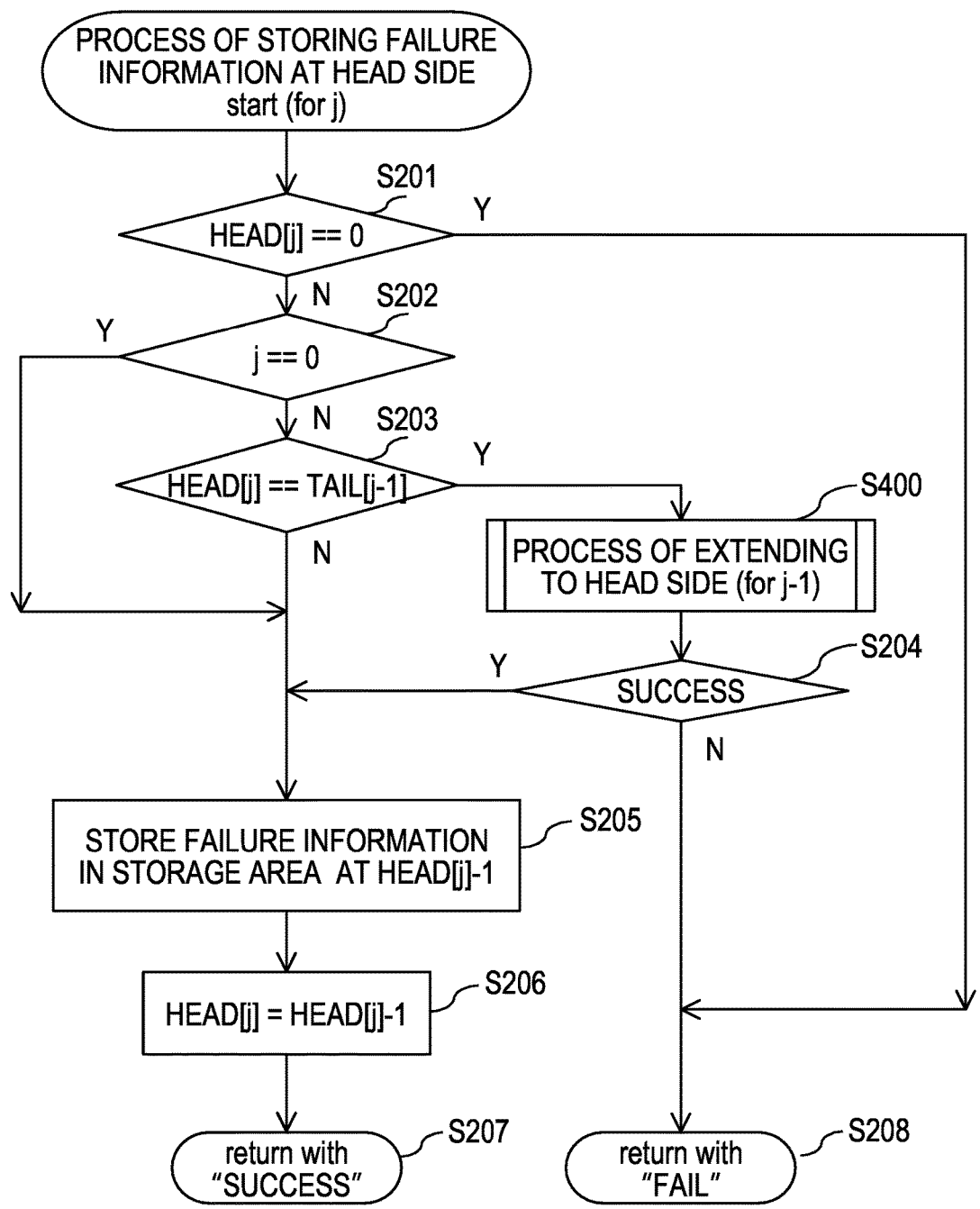
FIG. 12 is a flowchart illustrating an example of a process of storing failure information at HEAD side.

FIG. 12 is a flowchart illustrating an example of a process of storing failure information at HEAD side. In FIG. 12, the importance j is any one of importance levels 0 to 2. Here, the importance j may be substituted by the importance i given in S200 of FIG. 11 or the importance p given in S403 of FIG. 14 to be described later. The processor 210 starts a process of storing the failure information at HEAD[j] side. The processor 210 determines whether EI[0] is set to HEAD[j] (S201). When the processor 210 determines that EI[0] is set to HEAD[j] ("YES" in S201), the processor 210 determines that a free storage area EI does not exist, and returns with "FAIL" indicating that the new failure information is unable to be stored (S208). When the processor 210 determines that EI[0] is not set to HEAD[j] ("NO" in S201), the processor 210 determines whether the importance j is the highest importance (S202). When the processor 210 determines that the importance j is not the highest importance ("NO" in S202), the processor 210 determines whether the same element number is set to both HEAD[j] and TAIL[j−1] (S203). When the processor 210 determines that the same element number is not set to HEAD[j] and TAIL[j−1] ("NO" in S203), the processor 210 stores the failure information in a storage area EI just before the storage area EI set to HEAD[j] (S205). When the processor 210 determines that the importance j is the highest importance ("YES" in S202), the processor 210 performs S205. The processor 210 subtracts one (1) from the element number set to HEAD[j] (S206). When the operation S206 is completed, the processor 210 returns with "SUCCESS" indicating that the storage of the failure information is successful (S207).

When the processor 210 determines that the same element number is set to both HEAD[j] and TAIL[j−1] ("YES" in S203), the processor 210 performs a process (to be described later with reference to FIG. 14) of extending to HEAD side (S400). The processor 210 determines whether the process result in S400 is "SUCCESS" (S204). When the processor 210 determines that the result is "SUCCESS" ("YES" in S204), S205 is performed. When the processor 210 determines that the result is "FAIL", that is, when the new failure information is unable to be stored ("NO" in S204), the processor 210 returns with "FAIL" (S208).

Figure 13:
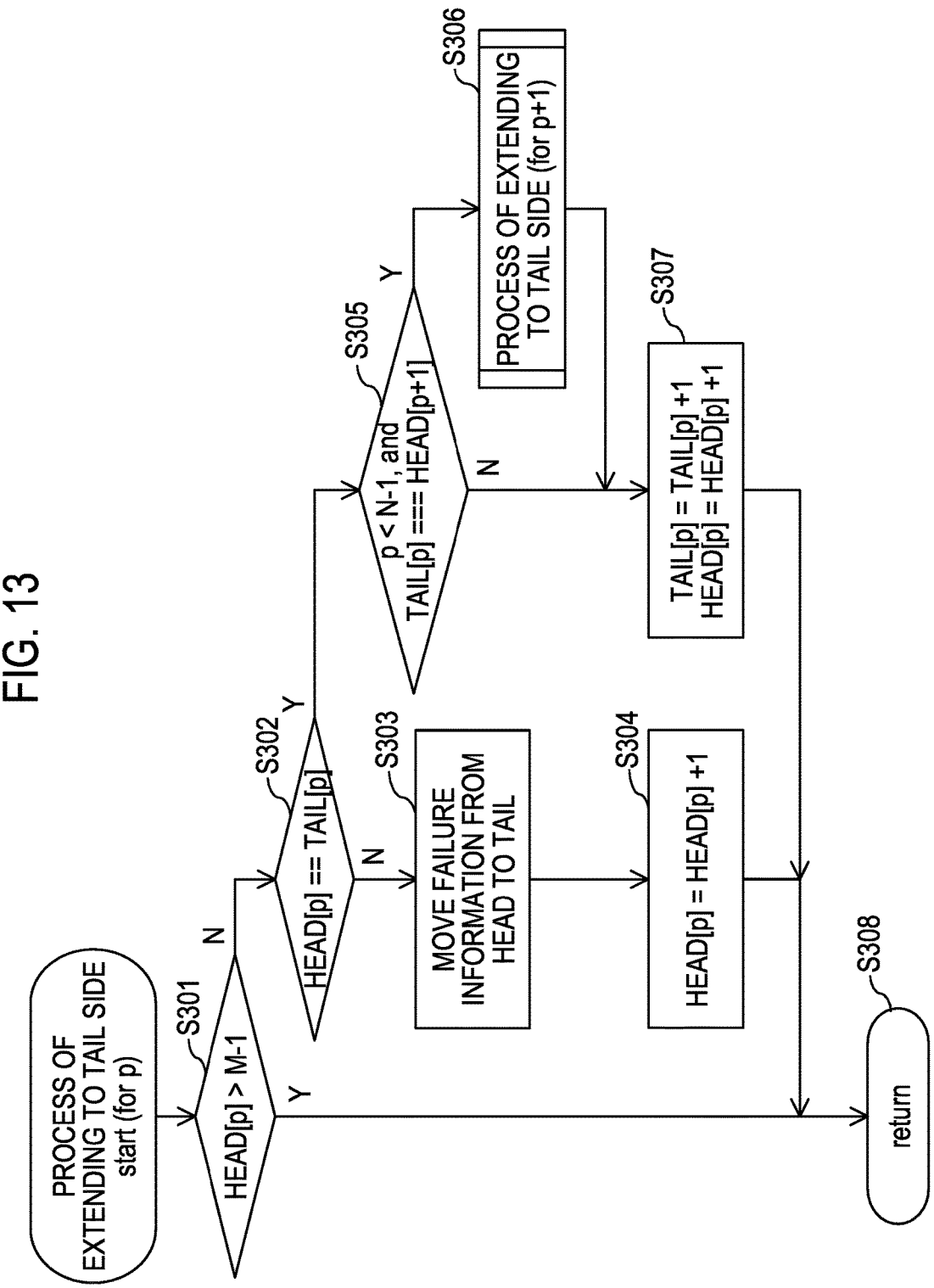
FIG. 13 is a flowchart illustrating an example of a process of extending to TAIL side.

FIG. 13 is a flowchart illustrating an example of a process of extending to TAIL side. In FIG. 13, the importance p is any one of importance levels 0 to 2. Here, the importance p may be substituted by the importance i+1 given in S300 of FIG. 11 or the importance p+1 given in S306 of FIG. 13 to be described below. The processor 210 starts a process of checking HEAD and TAIL on storage areas for the importance p. The processor 210 determines whether an element number set to HEAD[p] is larger than M−1 (S301). When the processor 210 determines that the element number set to HEAD[p] is larger than M−1 ("YES" in S301), the processor 210 returns. When the processor 210 determines that the element number set to HEAD[p] is not larger than M−1 ("NO" in S301), the processor 210 determines whether the same element number is set to both HEAD[p] and TAIL[p] (S302). When the processor 210 determines that the same element number is not set to HEAD[p] and TAIL[p] ("NO" in S302), the processor 210 moves the failure information stored in HEAD[p] to TAIL[p] (S303). The processor 210 adds one (1) to the element number set to HEAD[p] (S304).

When the processor 210 determines that the same element number is set to both HEAD[p] and TAIL[p] ("YES" in S302), the processor 210 determines whether the importance p is smaller than N−1, and whether the same element number is set to both TAIL[p] and HEAD[p+1] (S305). When the processor 210 determines that the importance p is smaller than N−1 and the same element number is set to both TAIL[p] and HEAD[p+1] ("YES" in S305), the processor 210 performs the process of extending to TAIL side (S306). After S306, the processor 210 adds one (1) to the element number set to TAIL[p] and HEAD[p] (S307). S307 is also performed when the importance p is not smaller than N−1 or the same element number is not set to TAIL[p] and HEAD[p+1]. When S304 or S307 is completed, the processor 210 returns (S308).

Figure 14:
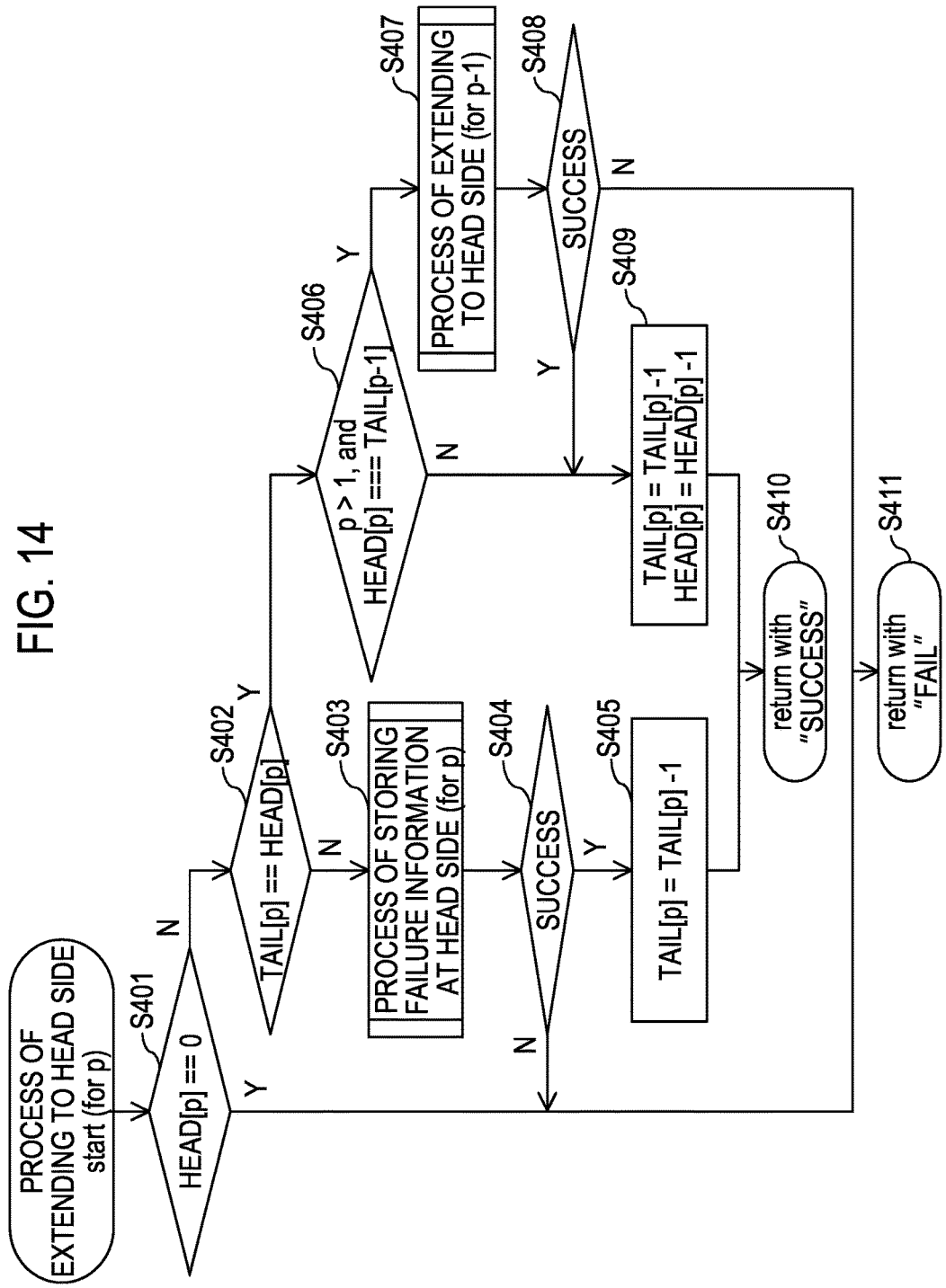
FIG. 14 is a flowchart illustrating an example of a process of extending to HEAD side.

FIG. 14 is a flowchart illustrating an example of a process of extending to HEAD side. In FIG. 14, the importance p is any one of 0 to 2. Here, the importance p may be substituted by the importance j−1 given in S400 of FIG. 12 or the importance p−1 given in S407 of FIG. 14 to be described below. The processor 210 starts a process of checking HEAD and TAIL on storage areas for importance p. The processor 210 determines whether EI[0] is set to HEAD[p] (S401). When the processor 210 determines that EI[0] is set to HEAD[p] ("YES" in S401), the processor 210 returns with "FAIL" indicating that the new failure information is unable to be stored (S411). When the processor 210 determines that EI[0] is not set to HEAD[p] ("NO" in S401), the processor 210 determines whether the same element number is set to both TAIL[p] and HEAD[p] (S402). When the processor 210 determines that the same element number is not set to TAIL[p] and HEAD[p] ("NO" in S402), the processor 210 performs the process of storing the failure information at HEAD[p] (S403). The processor 210 determines whether S403 is successful (S404). When the processor 210 determines that S403 is failed, the processor 210 returns with "FAIL" (S411). When the processor 210 determines that S403 is successful ("YES" in S404), the processor 210 subtracts one (1) from the element number set to TAIL[p] (S405). The processor 210 returns with "SUCCESS" indicating that the storage of the failure information is successful (S410).

When the processor 210 determines that the same element number is set to both TAIL[p] and HEAD[p] ("YES" in S402), the processor 210 determines whether the importance p is larger than 0, and whether the same element number is set to both HEAD[p] and TAIL[p−1] (S406). When the processor 210 determines that the importance p is larger than 0 and the same element number is set to both HEAD[p] and TAIL[p−1] ("YES" in S406), the processor 210 performs the process of extending to HEAD side (S407). The processor 210 determines whether the process result in S407 is "SUCCESS" (S408). When the processor 210 determines that the process result in S407 is "SUCCESS" ("YES" in S408), the processor 210 subtracts one (1) from the element number set to TAIL[p] and HEAD[p] (S409). When S409 is completed, the processor 210 returns with "SUCCESS" (S410). When the processor 210 determines that the process result in S407 is "FAIL" ("NO" in S408), the processor 210 returns with "FAIL" (S411).

When no free space exists in the storage areas, failure information with importance lower than the new failure information is moved from HEAD to TAIL, and failure information stored at HEAD of lowest failure information is overwritten. Accordingly, failure information with a high importance is preferentially stored in the storage device 100, and failure information with a low importance is overwritten. Thus, since the failure information with the high importance is left, the storage device 100 may be efficiently used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device, comprising:
   a memory; and
   a processor coupled to the memory and the processor configured to
   perform a diagnosis of hardware of the information processing device,
   generate plural pieces of failure information that each indicate a failure detected by the diagnosis, the plural pieces of failure information being classified into groups corresponding to respective different importance levels, store the plural pieces of failure information in consecutive storage areas of the memory, the consecutive storage areas being divided into storage sections corresponding to the respective groups in order of importance level, and store first piece of failure information in a head of a second storage section among the storage sections in absence of free areas in first storage section among the storage sections, the first piece of failure information being included in a first group among the groups, the first group corresponding to a first importance level among the importance levels, the first storage section being secured for the first group, the second storage section being secured for a second group among the groups, the second group corresponding to a second importance level among the importance levels, the second importance level being lower than the first importance level by one level, the first storage section and the head of the second storage section being consecutive.

2. The information processing device according to claim 1, wherein the processor is configured to move, when the head of the second storage section is occupied by a second piece of failure information included in the second group, the second piece of failure information to a free area in the second storage section or a head of a third storage section among the storage sections before storing the first piece of failure information in the head of the second storage section, the third storage section being secured for a third group among the groups, the third group corresponding to a third importance level among the importance levels, the third importance level being lower than the second importance level by one level, the second storage section and the head of the third storage section being consecutive.

3. The information processing device according to claim 1, wherein the processor is a central processing unit included in the information processing device, and the memory is available without being initialized after the information processing device is powered ON.

4. The information processing device according to claim 1, wherein the processor is configured to store the first piece of failure information in the head of the second storage section after storing the first piece of failure information from a head of the first storage section to a tail of the first storage section sequentially, and wherein the tail of the first storage section and the head of the second storage section are consecutive.

5. A non-transitory computer-readable recording medium having stored therein a program that causes a computer to execute a process, the process comprising:

performing a diagnosis of hardware of the computer;

generating plural pieces of failure information that each indicate a failure detected by the diagnosis, the plural pieces of failure information being classified into groups corresponding to respective different importance levels;

storing the plural pieces of failure information in consecutive storage areas of a memory, the consecutive storage areas being divided into storage sections corresponding to the respective groups in order of importance level; and storing first piece of failure information in a head of a second storage section among the storage sections in absence of free areas in first storage section among the storage sections, the first piece of failure information being included in a first group among the groups, the first group corresponding to a first importance level among the importance levels, the first storage section being secured for the first group, the second storage section being secured for a second group among the groups, the second group corresponding to a second importance level among the importance levels, the second importance level being lower than the first importance level by one level, the first storage section and the head of the second storage section being consecutive.

6. The non-transitory computer-readable recording medium according to claim 5, the process further comprising:

moving, when the head of the second storage section is occupied by a second piece of failure information included in the second group, the second piece of failure information to a free area in the second storage section or a head of a third storage section among the storage sections before storing the first piece of failure information in the head of the second storage section, the third storage section being secured for a third group among the groups, the third group corresponding to a third importance level among the importance levels, the third importance level being lower than the second importance level by one level, the second storage section and the head of the third storage section being consecutive.

7. The non-transitory computer-readable recording medium according to claim 5, the process further comprising:

storing the first piece of failure information in the head of the second storage section after storing the first piece of failure information from a head of the first storage section to a tail of the first storage section sequentially, and wherein the tail of the first storage section and the head of the second storage section are consecutive.

8. A method of storing failure information, the method comprising:

performing, by a computer, a diagnosis of hardware of the computer;

generating plural pieces of failure information that each indicate a failure detected by the diagnosis, the plural pieces of failure information being classified into groups corresponding to respective different importance levels;

storing the plural pieces of failure information in consecutive storage areas of a memory, the consecutive storage areas being divided into storage sections corresponding to the respective groups in order of importance level; and storing first piece of failure information in a head of a second storage section among the storage sections in absence of free areas in first storage section among the storage sections, the first piece of failure information being included in a first group among the groups, the first group corresponding to a first importance level among the importance levels, the first storage section being secured for the first group, the second storage section being secured for a second group among the groups, the second group corresponding to a second importance level among the importance levels, the second importance level being lower than the first importance level by one level, the first storage section and the head of the second storage section being consecutive.

9. The method according to claim 8, further comprising:
moving, when the head of the second storage section is occupied by a second piece of failure information included in the second group, the second piece of failure information to a free area in the second storage section or a head of a third storage section among the storage sections before storing the first piece of failure information in the head of the second storage section, the third storage section being secured for a third group among the groups, the third group corresponding to a third importance level among the importance levels, the third importance level being lower than the second importance level by one level, the second storage section and the head of the third storage section being consecutive.

10. The method according to claim 8, further comprising:
storing the first piece of failure information in the head of the second storage section after storing the first piece of failure information from a head of the first storage section to a tail of the first storage section sequentially, and
wherein the tail of the first storage section and the head of the second storage section are consecutive.

* * * * *